(12) United States Patent
Tsukioka

(10) Patent No.: US 9,329,464 B2
(45) Date of Patent: May 3, 2016

(54) IMAGE PROJECTION APPARATUS INCLUDING TWO VENTILATION UNITS

(71) Applicant: Yasutada Tsukioka, Kanagawa (JP)

(72) Inventor: Yasutada Tsukioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 220 days.

(21) Appl. No.: 13/951,785

(22) Filed: Jul. 26, 2013

(65) Prior Publication Data

US 2014/0055758 A1 Feb. 27, 2014

(30) Foreign Application Priority Data

Aug. 23, 2012 (JP) .................................. 2012-184529

(51) Int. Cl.
*G03B 21/16* (2006.01)
*H04N 9/31* (2006.01)
*G03B 21/14* (2006.01)
*G03B 21/20* (2006.01)
*G03B 21/28* (2006.01)
*G03B 33/08* (2006.01)

(52) U.S. Cl.
CPC .............. *G03B 21/16* (2013.01); *H04N 9/3144* (2013.01); *G03B 21/142* (2013.01); *G03B 21/145* (2013.01); *G03B 21/2066* (2013.01); *G03B 21/28* (2013.01); *G03B 33/08* (2013.01)

(58) Field of Classification Search
CPC ............................... G03B 21/16; H04N 9/3144
USPC ............................... 353/52, 57, 58, 59, 60, 61
See application file for complete search history.

(56) References Cited

U.S. PATENT DOCUMENTS

| 6,488,378 | B1 * | 12/2002 | Tabuchi et al. ............... 353/52 |
| 6,739,831 | B2 * | 5/2004 | Hsu et al. ........................ 415/60 |
| 7,018,049 | B2 * | 3/2006 | Wu .......................... G03B 21/18 353/58 |
| 7,481,540 | B2 * | 1/2009 | Morimoto et al. ............... 353/57 |
| 7,510,285 | B2 * | 3/2009 | Takemi et al. ................... 353/61 |
| 8,061,852 | B2 * | 11/2011 | Noda et al. ....................... 353/61 |
| 8,317,336 | B2 * | 11/2012 | Noda et al. ....................... 353/61 |
| 8,608,316 | B2 * | 12/2013 | Noda et al. ....................... 353/61 |
| 2003/0179579 | A1 * | 9/2003 | Hsu et al. ....................... 362/294 |

(Continued)

FOREIGN PATENT DOCUMENTS

| JP | 11-087963 | 3/1999 |
| JP | 2008-292832 | 12/2008 |

OTHER PUBLICATIONS

U.S. Appl. No. 13/777,505, filed Feb. 26, 2013.

(Continued)

*Primary Examiner* — Bao-Luan Le
(74) *Attorney, Agent, or Firm* — Oblon, McClelland, Maier & Neustadt, L.L.P.

(57) ABSTRACT

An image projection apparatus includes a light source; an intake port to take in low-temperature air into the image projection apparatus; an exhaust port to exhaust air from the image projection apparatus; a first ventilation unit to generate an air flow from the intake port to the exhaust port; a first flow path for hot-air exhaust; a second flow path for a part of the low-temperature air, taken from the intake port; and a mixing unit to mix the hot-air exhaust flowing from the first flow path and the low-temperature air flowing from the second flow path; and a second ventilation unit to generate an air flow for the second flow path to the mixing unit. The air exhausted from the mixing unit converges with another part of the low-temperature air, flowing from a third flow path outside the mixing unit.

10 Claims, 23 Drawing Sheets

(56) References Cited

U.S. PATENT DOCUMENTS

| | | | |
|---|---|---|---|
| 2004/0189953 A1* | 9/2004 | Wu | G03B 21/18 353/58 |
| 2005/0012905 A1* | 1/2005 | Morinaga | 353/58 |
| 2006/0146293 A1* | 7/2006 | Morimoto et al. | 353/61 |
| 2006/0170876 A1* | 8/2006 | Takemi et al. | 353/61 |
| 2007/0182934 A1* | 8/2007 | Noda et al. | 353/57 |
| 2009/0268170 A1* | 10/2009 | Nakashita | 353/61 |
| 2011/0134343 A1* | 6/2011 | Minami | 348/748 |
| 2013/0021584 A1* | 1/2013 | Noda et al. | 353/61 |
| 2013/0070216 A1 | 3/2013 | Fujioka et al. | |
| 2013/0114045 A1 | 5/2013 | Fujioka et al. | |
| 2013/0114050 A1 | 5/2013 | Yamada et al. | |
| 2013/0114052 A1 | 5/2013 | Fujioka et al. | |
| 2013/0114054 A1 | 5/2013 | Ishikawa et al. | |
| 2013/0114274 A1 | 5/2013 | Fujioka et al. | |
| 2013/0128234 A1 | 5/2013 | Fujioka et al. | |
| 2013/0242269 A1 | 9/2013 | Kanai et al. | |
| 2013/0242270 A1 | 9/2013 | Tsukioka et al. | |

OTHER PUBLICATIONS

U.S. Appl. No. 13/775,713, filed Feb. 25, 2013.

\* cited by examiner

IMAGE PROJECTION APPARATUS INCLUDING TWO VENTILATION UNITS

CROSS-REFERENCE TO RELATED APPLICATION

This application claims priority pursuant to 35 U.S.C. §119 to Japanese Patent Application No. 2012-184529, filed on Aug. 23, 2012 in the Japan Patent Office, the disclosure of which is incorporated by reference herein in its entirety.

BACKGROUND

1. Technical Field

The present invention relates to an image projection apparatus.

2. Background Art

Image projection apparatuses such as projectors receive image data from personal computers or video cameras to project an image using an image projector. The image projector projects and displays the image onto a screen using light emitted from a light source.

The light source of the image projection apparatus may be a halogen lamp, a metal-halide lamp, or a high-pressure mercury vapor lamp, all of which generate heat when they emit light. Therefore, a ventilation unit such as a blower or a fan is used to cool the light source. The air used for cooling the light source is itself heated by the light source and is then exhausted as hot exhaust from an exhaust unit such as an exhaust port. This hot-air exhaust can reach uncomfortably high temperatures.

JP-2008-292832-A and JP-2910742-B (or JP-H11-87963-A) disclose image projection apparatuses having a mixing unit that mixes the hot-air exhaust with cool air to decrease the temperature of the hot-air exhaust, and then such mixed air is exhausted from the exhaust port. However, this approach cannot lower the temperature of the exhaust to acceptable levels because the hot-air exhaust and cool air are mixed only once.

SUMMARY

In one aspect of the present invention, an improved image projection apparatus is devised. The image projection apparatus includes a light source to emit light for projecting an image to be projected; an intake port to take low-temperature air into the image projection apparatus; an exhaust port to exhaust air from the image projection apparatus; a first ventilation unit to generate an air flow from the intake port to the exhaust port; a first flow path for hot-air exhaust; a second flow path for a part of the low-temperature air, taken from the intake port, having a temperature lower than the hot-air exhaust; a mixing unit to mix the hot-air exhaust from the first flow path and the low-temperature air from the second flow path, wherein the air mixed and exhausted from the mixing unit converges at a space between the mixing unit and the exhaust port with another part of the low-temperature air taken from the intake port, flowing from a third flow path outside the mixing unit; and a second ventilation unit to generate an air flow into the second flow path of the mixing unit.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
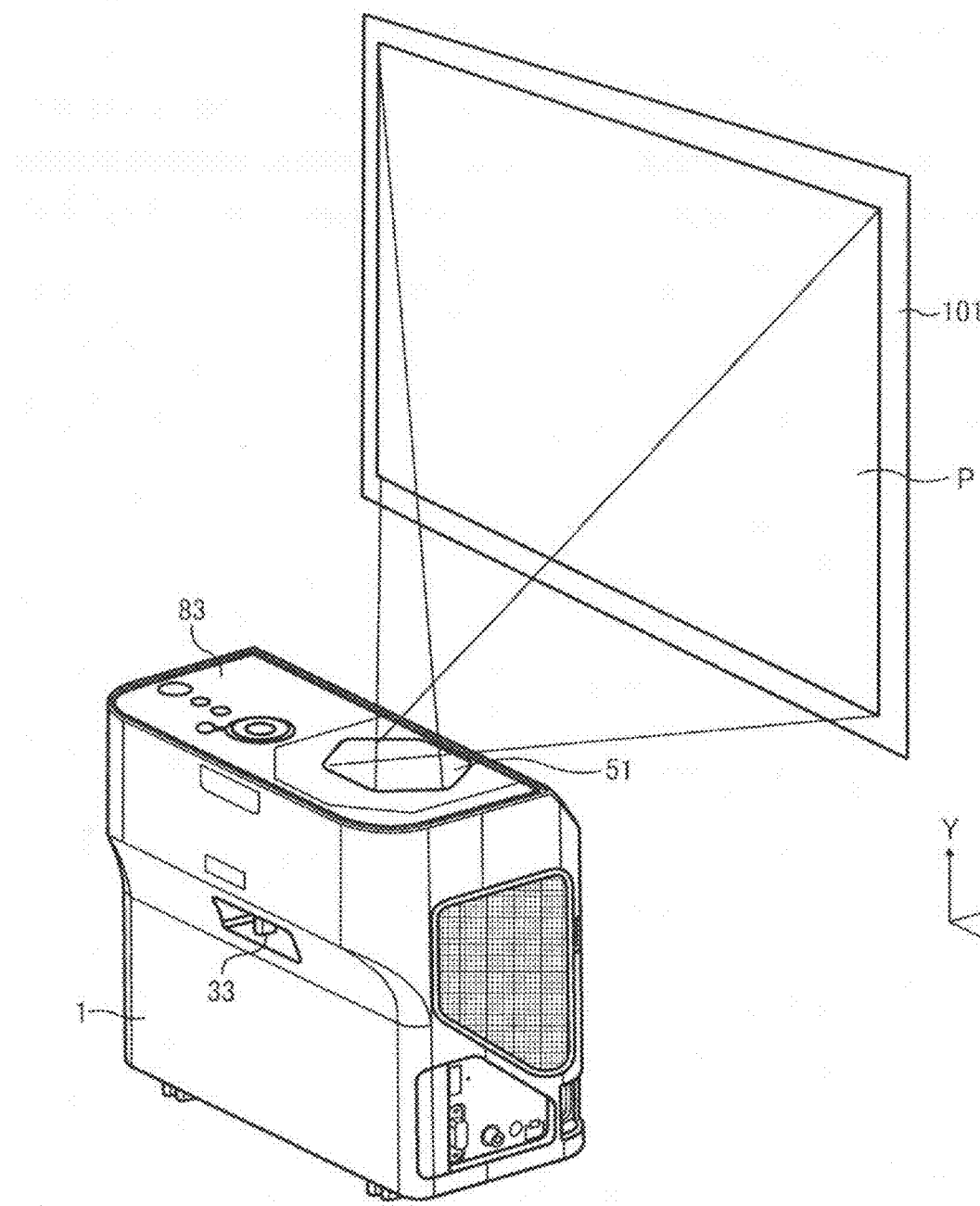
FIG. 1 shows a perspective view of a projector according to an example embodiment and a projection plane.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have the same function, operate in a similar manner, and achieve a similar result.

Referring now to the drawings, a description is given of an apparatus or system for an image projection apparatus such as a projector according to an example embodiment is described hereinafter.

FIG. 1 shows a perspective view of a projector 1 and a projection plane 101. The projector 1 includes, for example, a transparent glass 51, an operation unit 83, and a focus lever 33. As shown in FIG. 1, the projector 1 has the transparent glass 51 on its top face, from which a projection image P is projected to the projection plane 101. The projection image P projected from the transparent glass 51 is displayed on the projection plane 101 such as a screen. Further, the projector 1 has the operation unit 83 on its top face, by which a user can operate the projector 1. Further, the projector 1 has the focus lever 33 on its side face for adjusting the focus of image. Hereinafter, the normal line direction of the projection plane 101 is set as X direction, the short side direction of the projection plane 101 (or top/bottom direction) is set as Y direction, and the long side direction of the projection plane 101 (or horizontal direction) is set as Z direction.

Figure 2:
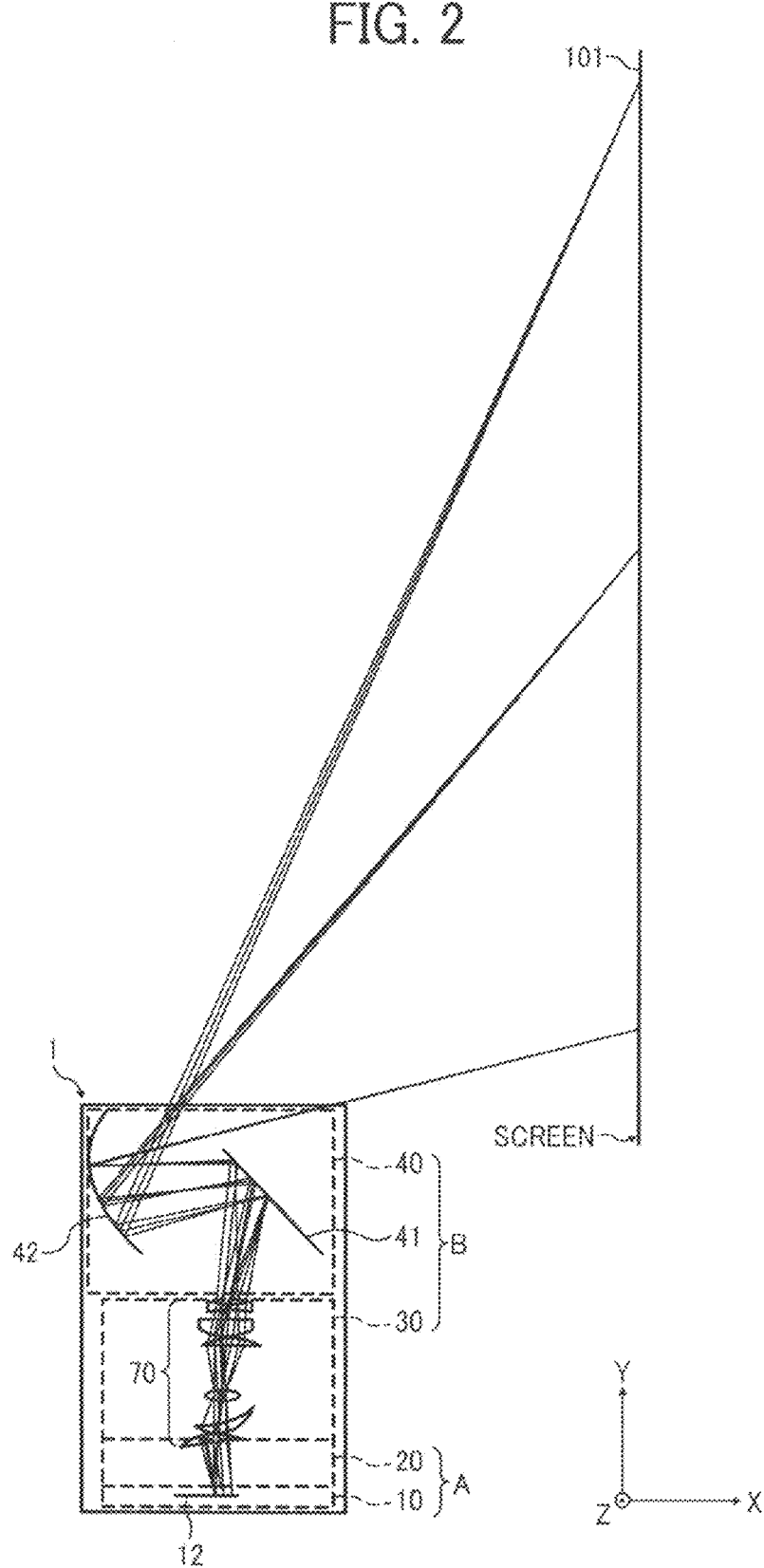
FIG. 2 shows a pattern of light paths from a projector to a projection plane.

FIG. 2 shows a pattern of light paths from the projector 1 to the projection plane 101. The projector 1 includes, for example, a light source unit having a light source, and an image generator A to generate images using the light emitted from the light source. The image generator A includes, for example, an image generation unit 10, and a lighting unit 20. The projector 1 further includes a projection optical system B. The image generation unit 10 includes an image generation element such as a digital mirror device (DMD) 12. The lighting unit 20 reflects and radiates light coming from the light source to the DMD 12 to generate a light image. The projection optical system B projects the light image on the projection plane 101. The projection optical system B includes a least one pass-through type reflection optical system. For example, the projection optical system B includes a first optical unit 30, and a second optical unit 40. The first optical unit 30 includes, for example, a first optical system 70 of co-axial system having the positive power. The second optical unit 40 includes, for example, a reflection mirror 41, and a curved mirror 42 having the positive power.

The DMD 12 can generate an image using the light emitted from the light source. Specifically, the light emitted from the light source irradiates the DMD 12 and an image is generated by modulating the light irradiated by the lighting unit 20. The image generated by the DMD 12 is projected onto the projection plane 101 via the first optical system 70 of the first optical unit 30, and the reflection mirror 41 and the curved mirror 42 of the second optical unit 40.

Figure 3:
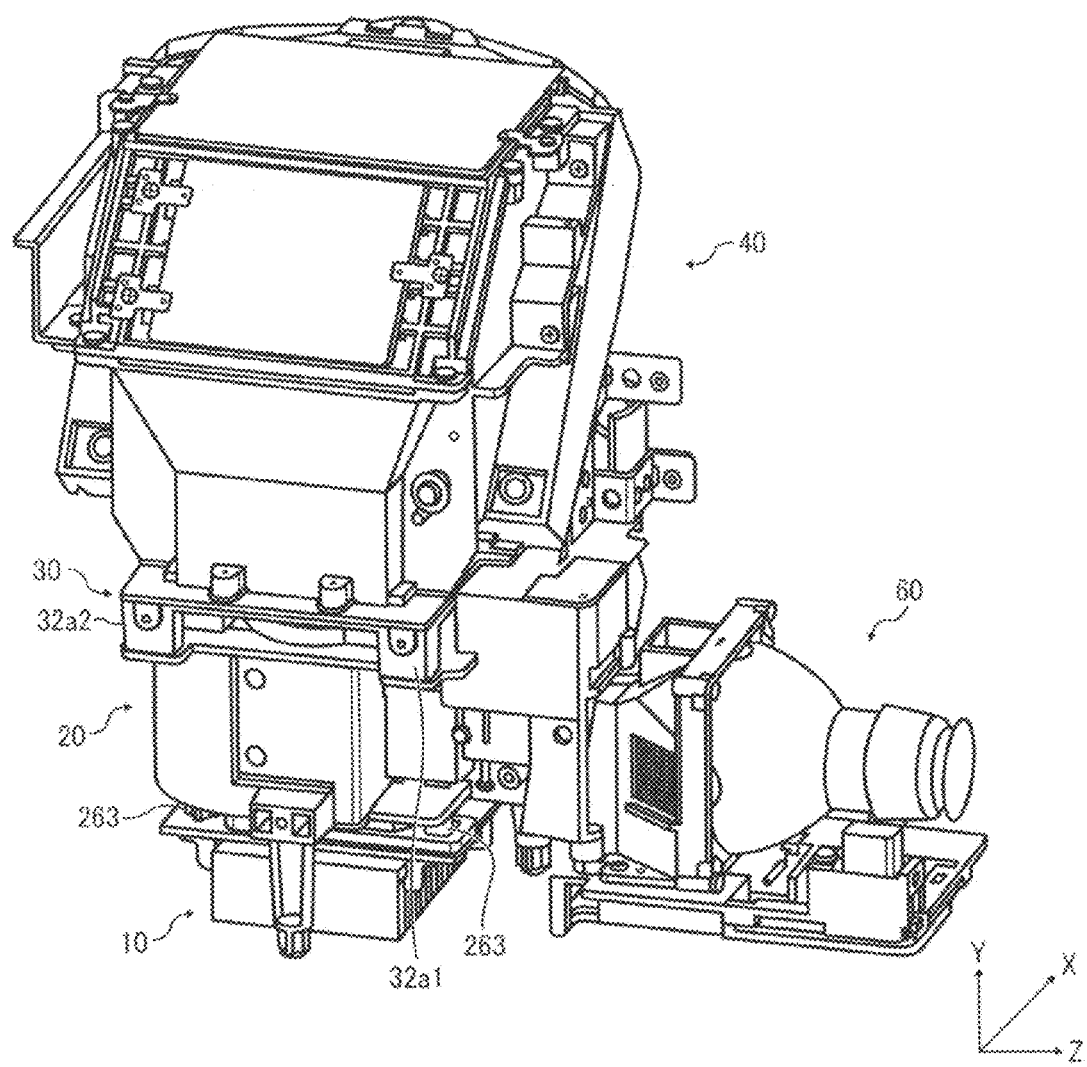
FIG. 3 shows a schematic perspective view of a projector.

FIG. 3 shows a schematic perspective view of an internal configuration of the projector 1. As shown in FIG. 3, the image generation unit 10, the lighting unit 20, the first optical unit 30, the second optical unit 40 are arranged along the Y direction in FIG. 3 parallel to the projection plane 101. Further, a light source unit 60 can be disposed at a right side of the lighting unit 20 in FIG. 3.

Further, as shown in FIG. 3, the first optical unit 30 has a lens holder 32 having legs 32a1 and 32a2, and the image generation unit 10 has screw stoppers 263 used to fix the image generation unit 10 to the lighting unit 20 using screws.

Figure 4:
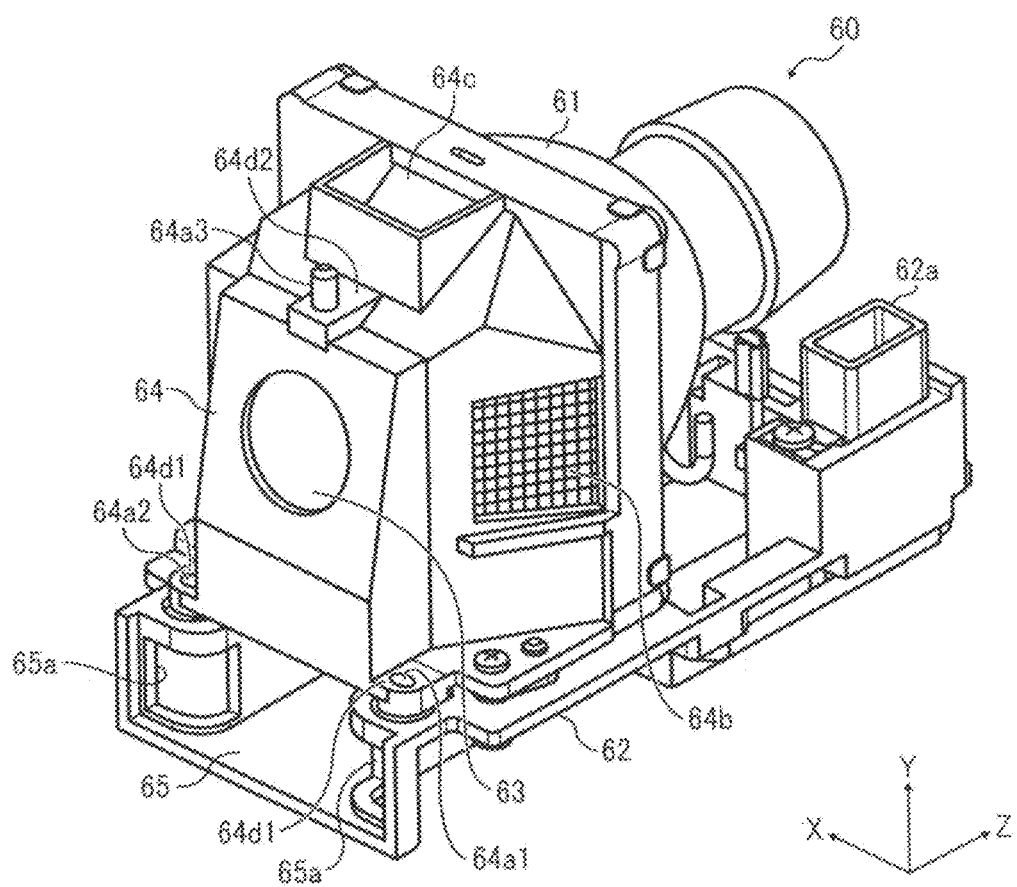
FIG. 4 shows a perspective view of a main unit of a projector.

A description is given of the configuration of each unit. Initially, the light source unit 60 is described. FIG. 4 shows a schematic perspective view of the light source unit 60. The light source unit 60 includes a light-source bracket 62, and a light source 61 fixed on the light-source bracket 62. The light source 61 is, for example, a halogen lamp, a metal-halide lamp, and a high-pressure mercury vapor lamp. Further, the light-source bracket 62 has a connector 62a connectable to a power-source connector of a power source unit 80 (see FIG. 14).

Further, a holder 64 is fixed on the light exiting side of the light source 61 disposed on the light-source bracket 62 by using screws, wherein the holder 64 retains a reflector or the like. Further, a light exiting window 63 is disposed for the holder 64 while the light exiting window 63 is disposed at a side opposite the position of the light source 61. The light emitted from the light source 61 can be guided to the light exiting window 63 by the reflector retained in the holder 64, and exits from the light exiting window 63.

Figure 6:
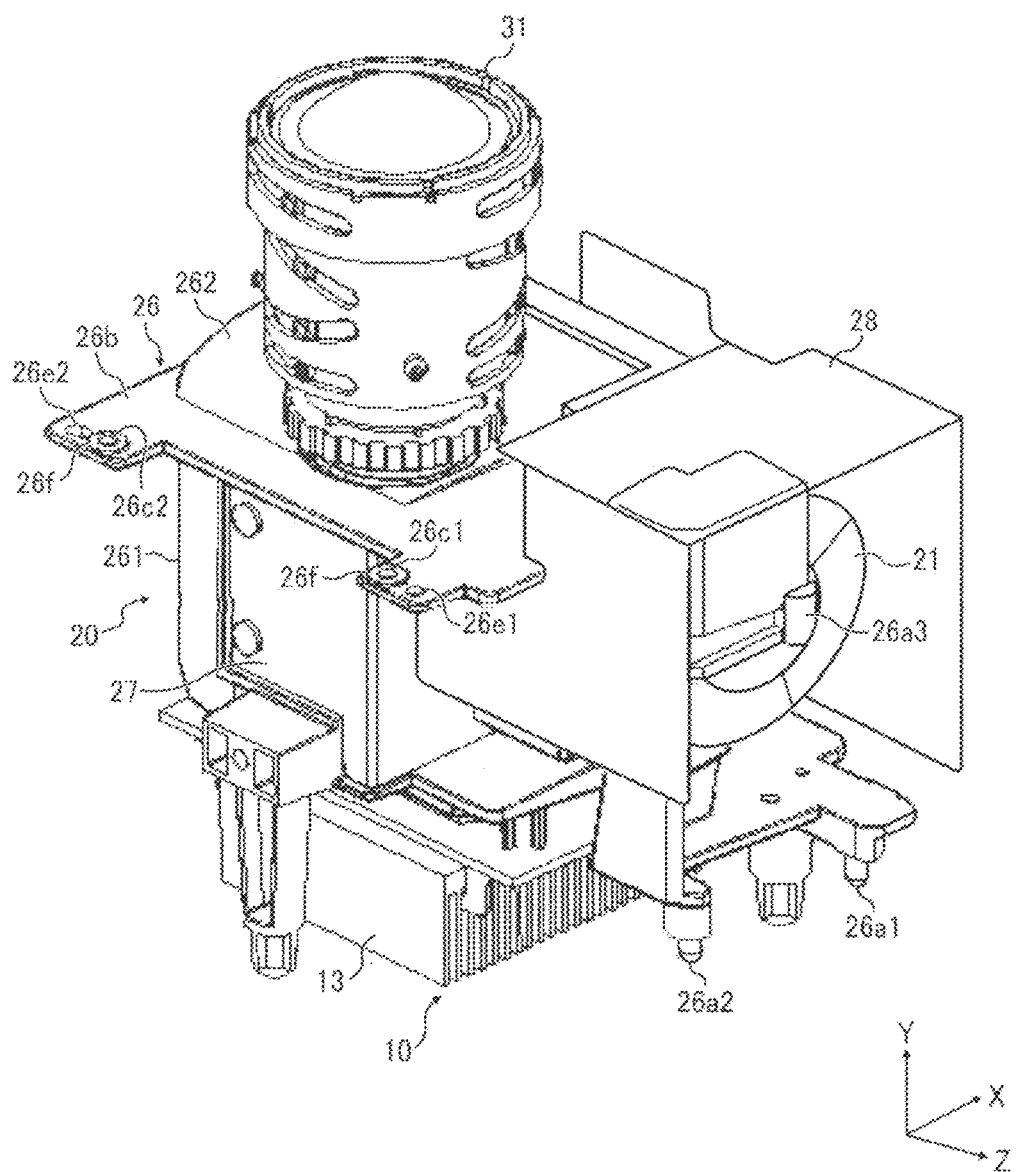
FIG. 6 shows a schematic perspective view of a light source unit.

Further, light source position-setting members 64a1 to 64a3 are disposed at the top face of the holder 64 and both ends of the X direction of the bottom face of the holder 64 so that the light source unit 60 can be positioned correctly on a lighting unit bracket 26 of the lighting unit 20 (FIG. 6). For example, the light source position-setting member 64a3 disposed at the top face of the holder 64 has a protruded-shape, and the light source position-setting members 64a1 and 64a2 disposed at the bottom face of the holder 64 have a hole shape.

Further, a light-source air intake port 64b is disposed at a side face of the holder 64 to take in air used for cooling the light source 61, and a light-source air exhaust port 64c is disposed at the top face of the holder 64 to exhaust air heated by the heat of the light source 61.

Further, a pass-through area 65 is disposed for the light-source bracket 62 to take in air sucked in by an air-intake blower 91 (see FIG. 20) to be described later. Further, an opening 65a is disposed at an air-intake side of the pass-through area 65 as shown in FIG. 4 to send a part of airflow flowing into the pass-through area 65 to a space between the light source unit 60 and an openably closable cover 54 (see FIG. 18), to be described later. The cooling of the light source unit 60 will be described later. The pass-through area 65 may be also referred to as the duct 65.

Further, as shown in FIG. 4, the light source position-setting member 64a3 having a protruded-shape is provided on a plane face portion 64d2 disposed at the top face of the holder 64, and the light source position-setting members 64a1 and 64a2 having the hole shape is disposed at a plane face portion 64d1 of the bottom face of the holder 64. Such plane face portion 64d2 and the plane face portion 64d1 can be used as abutting members to be abutted to the lighting unit bracket 26 when pressed by a pressing member of the openably closable cover 54 to be described later.

Figure 5:
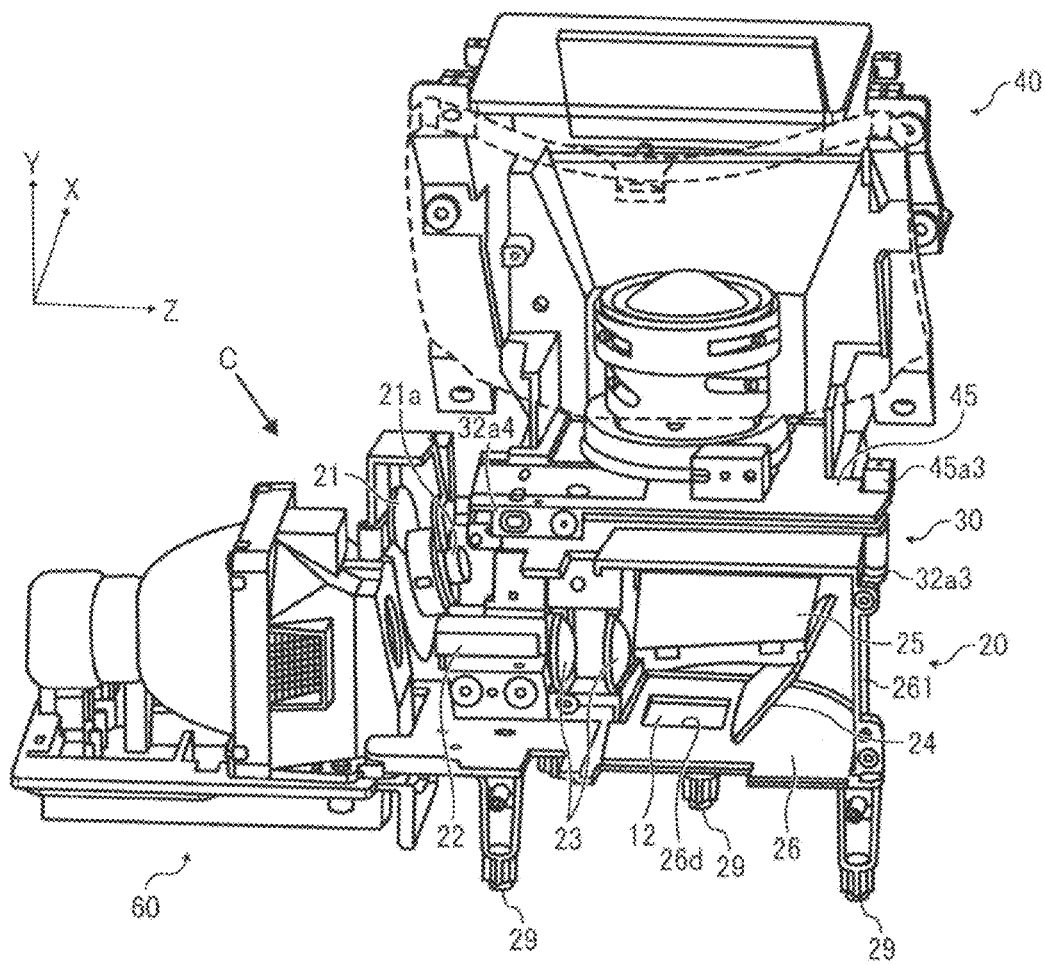
FIG. 5 shows a perspective view of an image generation unit.

A description is given of the lighting unit 20 with reference to FIG. 5, which shows a perspective view of optical parts encased in the lighting unit 20 and other units. As shown in FIG. 5, the lighting unit 20 includes, for example, a color wheel 21, a light tunnel 22, two relay lenses 23, a cylinder mirror 24, and a concave mirror 25, wherein such parts can be retained by the lighting unit bracket 26. The lighting unit bracket 26 includes, for example, a casing 261 that encases the relay lenses 23, the cylinder mirror 24, and the concave mirror 25. Among four sides of the casing 261, only one side has a side face (i.e., right side of FIG. 5), and other three sides are opening. Further, an OFF plate 27 (FIG. 6) is disposed at one opening-side of the X direction in FIG. 5, and a cover member is disposed at another opening-side of the X direction in FIG. 5. With this configuration, the relay lenses 23, the cylinder mirror 24, and the concave mirror 25 encased in the casing 261 of the lighting unit bracket 26 can be covered by the lighting unit bracket 26, the OFF plate 27, and the cover member.

Further, a through-hole 26d is disposed on the bottom face of the casing 261 of the lighting unit bracket 26 so that the DMD 12 can be exposed through the through-hole 26d.

Further, the lighting unit bracket 26 includes, for example, three legs 29. Such legs 29 can contact a base member 53 (see FIGS. 13, 18, 19) of the projector 1 to support the weight of the first optical unit 30 and the second optical unit 40 stacked and fixed on the lighting unit bracket 26. Further, by providing the legs 29, a space for taking in external air to a heat exchanger such as a heat sink 13 (FIG. 6) that cools the DMD 12 of the image generation unit 10, can be arranged, to be described later.

Further, as shown in FIG. 5, the lens holder 32 of the first optical unit 30 includes, for example, legs 32a3 and 32a4, and the second optical unit 40 includes, for example, a screw stopper 45a3.

FIG. 6 shows a perspective view of the image generation unit 10, the lighting unit 20, and a projection lens unit 31 viewed from the direction C shown in FIG. 5. The casing 261 of the lighting unit bracket 26 has a top face 26b extending in a direction perpendicular to the Y direction of FIG. 6. Through-holes are disposed at four corners of the top face 26b to fasten the first optical unit 30 with screws by inserting the screws into the through-holes. For example, FIG. 6 shows the through-holes 26c1 and 26c2. Further, as shown in FIG. 6, position-setting holes 26e1 and 26e2 are respectively disposed next to the through-holes 26c1 and 26c2 to set the first optical unit 30 at a correct position with the lighting unit 20.

As for such position-setting holes 26e1 and 26e2, the position-setting hole 26e1 disposed at the color wheel 21 side is used as a primary position-setting hole having a circular hole shape, and the position-setting hole 26e2 disposed at an opposite side of the color wheel 21 is used as a secondary position-setting hole having a slot hole extending in the Z direction.

Further, a position-setting protrusion 26f is disposed around each of the through-holes 26c1 and 26c2, wherein the position-setting protrusion 26f protrudes from the top face 26b of the lighting unit bracket 26. The position-setting protrusion 26f is used to set the first optical unit 30 at a correct position in the Y direction. If the precision of positioning is to be enhanced in the Y direction without providing the position-setting protrusion 26f, the flatness of the entire top face of the lighting unit bracket 26 is required to be enhanced, which is costly. By providing the position-setting protrusion 26f, the flatness is required to be enhanced only at the position-setting protrusion 26f. Therefore, the precision of positioning can be enhanced in the Y direction while reducing the cost.

Further, the top face of the lighting unit bracket 26 has an opening covered by a light shield plate 262 engaging the lower end of the projection lens unit 31, by which the intrusion of light from the upper side into the casing 261 can be prevented.

Further, the top face 26b of the lighting unit bracket 26 has a cutout between the through-holes 26c1 and 26c2 of the top face 26b so that the second optical unit 40 can be screwed to the first optical unit 30 easily, to be described later.

A light source positioning member 26a3 is disposed at one end of the lighting unit bracket 26 at the color wheel 21 side (Z direction in FIG. 6). The light source positioning member 26a3 has a cylinder-like shape having a through-hole, to which the light source position-setting member 64a3 having the protruded-shape (FIG. 4), disposed at the top face of the holder 64 of the light source unit 60, engages. Further, two light source positioning members 26a1 and 26a2 having protruded-shape are disposed at a lower side of the light source positioning member 26a3, to which the light source position-setting member 64a1 and 64a2 disposed on the holder 64 at the light-source bracket 62 side, which are the through-holes, engage respectively. By respectively engaging the light source position-setting members 64a1 to 64a3 disposed for the holder 64 to the light source positioning members 26a1 to 26a3 disposed for the lighting unit bracket 26 of the lighting unit 20, the light source unit 60 can be fixed at the correct position of the lighting unit 20 (FIG. 3).

Further, the lighting unit bracket 26 includes a lighting unit cover 28 that covers the color wheel 21 and the light tunnel 22.

Figure 7:
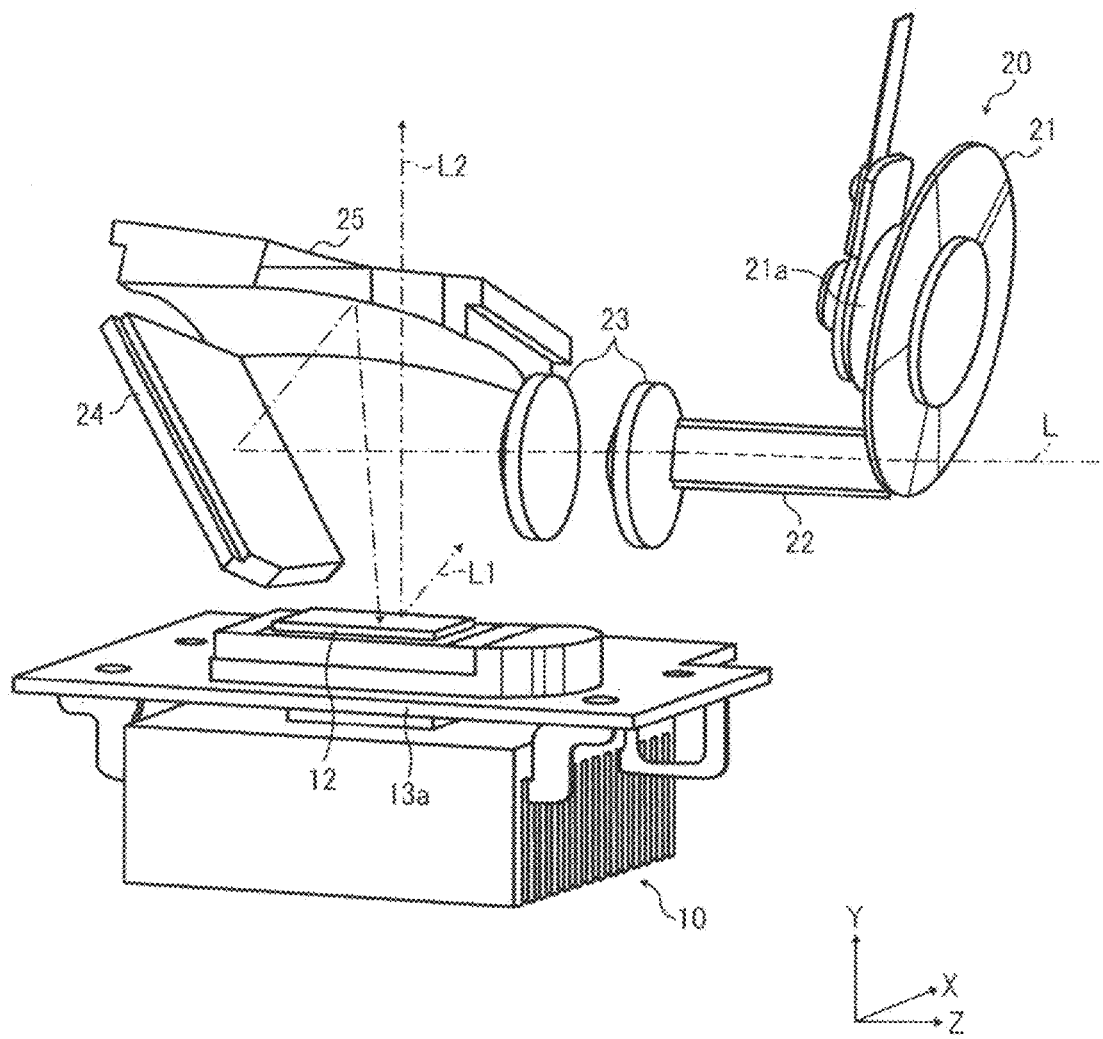
FIG. 7 shows a perspective view of an image generation unit and a lighting unit.

FIG. 7 shows a light path L of light in the lighting unit 20. The color wheel 21 has a disc shape and is fixed on a motor shaft of a color motor 21a. The color wheel 21 includes, for example, R (red), G (green), and B (blue) filters along the rotation direction. The light focused by a reflector disposed for the holder 64 of the light source unit 60 passes through the light exiting window 63, and then reaches the peripheral area of the color wheel 21. The light that has reached the peripheral area of the color wheel 21 is separated into R, G and B lights along the timeline as the color wheel 21 rotates. The lights separated by the color wheel 21 enter the light tunnel 22. The light tunnel 22 is a tube-shaped member having a square-like cross shape, and its internal face is finished as a mirror face. The light entered the light tunnel 22 reflects a plurality of times on the internal face of the light tunnel 22, and is then emitted as uniform light to the relay lenses 23.

The light that has passed the light tunnel 22 passes the two relay lenses 23, reflects on the cylinder mirror 24 and the concave mirror 25, and is then focused on an image generation face of the DMD 12 as an image.

Figure 8:
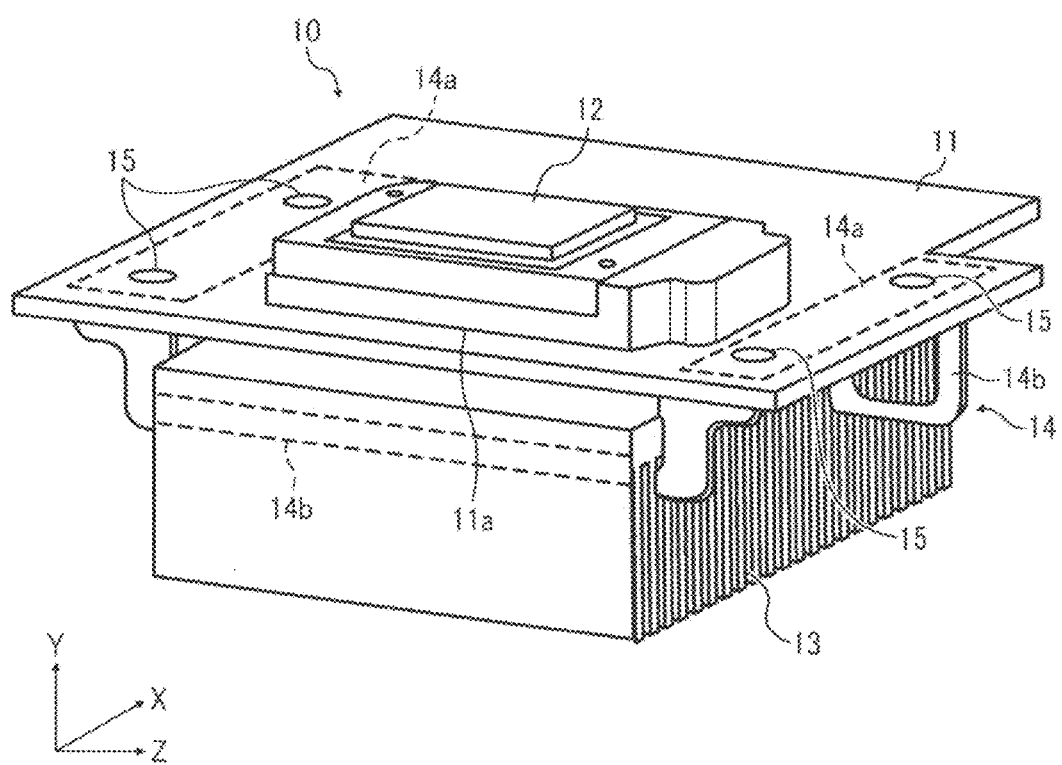
FIG. 8 shows a perspective view of the image generation unit of FIG. 7.

A description is given of the image generation unit 10 with reference to FIG. 8, which shows a perspective view of the image generation unit 10. As shown in FIG. 8, the image generation unit 10 includes, for example, a DMD board 11 to which the DMD 12 is attached. The DMD 12 is attached to a socket 11a disposed on the DMD board 11 while orienting an image generation face composed of micro mirrors arranged in a lattice pattern to an upward direction. The DMD board 11 includes a drive circuit to drive micro mirrors.

A heat exchanger such as the heat sink 13 is fixed on a distal side of the DMD board 11 (i.e., a face opposite a face having the socket 11a) to cool the DMD 12. The DMD board 11 has a through-hole area to which the DMD 12 is attached, and the heat sink 13 has a protruded portion 13a (FIG. 7) insertable into the through-hole area. The protruded portion 13a has an edge portion having a flat shape. By inserting the protruded portion 13a into the through-hole area, the flat edge portion of the protruded portion 13a can contact the distal side of the DMD 12 (i.e., face opposite the image generation face). An elastic and flexible heat conduction sheet can be attached on the flat edge portion of the protruded portion 13a and/or an area of the distal side of the DMD 12 so that the heat sink 13 and the distal side of the DMD 12 can be closely contacted to enhance the thermal conductivity.

The heat sink 13 can be fixed on a face opposite a face disposed of the socket 11a of the DMD board 11 by applying pressure using a fixing device 14. The fixing device 14 includes, for example, a plate-like fixing part 14a at a right distal side of the DMD board 11 (right side in FIG. 8), and a plate-like fixing part 14a at a left distal side of the DMD board 11 (left side in FIG. 8) disposed at as counterpart members with each other. As shown in FIG. 8, one end and other end of the plate-like fixing parts 14a are linked by a pressure member 14b extending in the Z direction in FIG. 8.

When the image generation unit 10 is fixed to the lighting unit bracket 26 (FIG. 6) using screws, the heat sink 13 is pressed and fixed to the face opposite the face disposed of the socket 11a of the DMD board 11 by applying force from the fixing device 14.

A description is given of fixing of the lighting unit bracket 26 of the image generation unit 10. Initially, the image generation unit 10 is positioned with respect to the lighting unit bracket 26 so that the DMD 12 can face the through-hole 26d disposed on the bottom face of the lighting unit bracket 26 of the lighting unit 20 (FIG. 5). Then, a screw is inserted into each of through-holes disposed for the fixing part 14a, and each of through-holes 15 disposed for the DMD board 11 from a lower side, and the screw is screwed into each of screw holes disposed at the bottom face of the screw stopper 262 (FIG. 3) of the lighting unit bracket 26 to fix the image generation unit 10 to the lighting unit bracket 26. Further, as the screw is screwed into the screw stopper 262 disposed for the lighting unit bracket 26, the pressure member 14b presses the heat sink 13 toward the DMD board 11. With this configuration, the heat sink 13 can be pressed and fixed on the face opposite the face disposed with the socket 11a of the DMD board 11 by using the fixing device 14.

As described above, the image generation unit 10 can be fixed to the lighting unit bracket 26, and the three legs 29 shown in FIG. 5 can support the weight of the image generation unit 10.

The image generation face of the DMD 12 is composed of a plurality of movable micro mirrors arranged in a lattice pattern. Each of micro mirrors can incline the mirror face about a torsion shaft for a given angle, and can be set with two conditions of "ON" and "OFF". When the micro mirror is set "ON", the light coming from the light source 61 is reflected toward the first optical system 70 (FIG. 2) as shown by an arrow L2 shown in FIG. 7. When the micro mirror is set "OFF", the light coming from the light source 61 is reflected toward the OFF plate 27, retained on the side face of the lighting unit bracket 26 shown in FIG. 6, as shown by an arrow L1 shown in FIG. 7. Therefore, by driving each mirror independently, the light projection can be controlled for each pixel of image data to generate an image.

The light reflected to the OFF plate 27 is absorbed as heat and then the OFF plate 27 is cooled by the airflow flowing outside the OFF plate 27.

Figure 9:
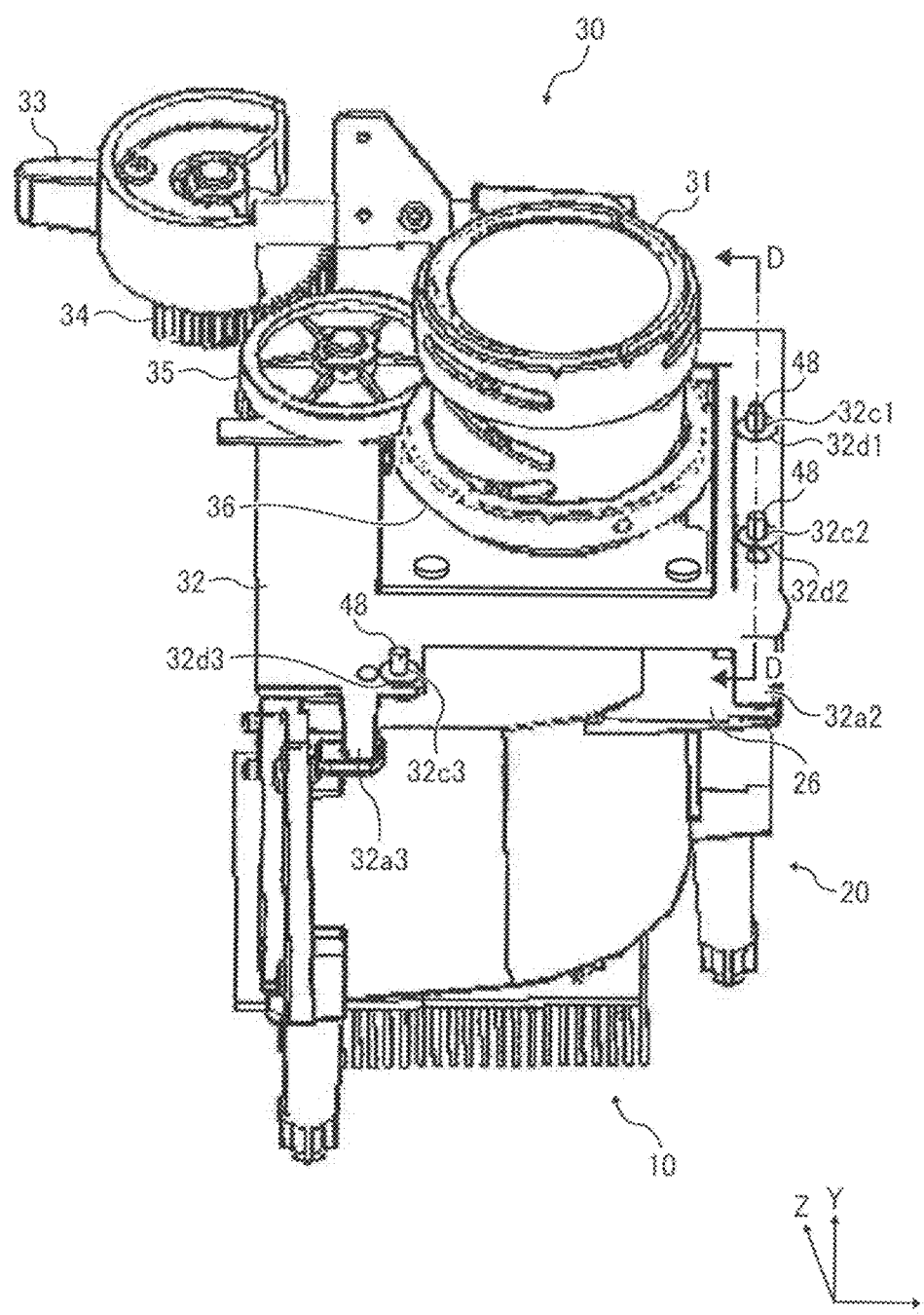
FIG. 9 shows a perspective view of a first optical unit with the lighting unit and the image generation unit.

A description is given of the first optical unit 30 with reference to FIG. 9, which shows a perspective view of the first optical unit 30 with the lighting unit 20 and the image generation unit 10. As shown in FIG. 9, the first optical unit 30 is disposed over the lighting unit 20, and includes, for example, the projection lens unit 31, and the lens holder 32. The projection lens unit 31 retains the first optical system 70 (FIG. 2) composed of a plurality of lenses, and the lens holder 32 retains the projection lens unit 31. The lens holder 32 is disposed with four legs 32a1 to 32a4 extending toward the downside, wherein FIG. 9 shows the legs 32a2 and 32a3. The leg 32a1 is shown in FIG. 3, and the leg 32a4 is shown in FIG. 5. Each of the legs 32a1 to 32a4 is formed of a screw hole on its bottom face to be used when fixed with the lighting unit bracket 26 using a screw. Further, the projection lens unit 31 is disposed with a focus gear 36 meshed with an idler gear 35. The idler gear 35 is meshed with a lever gear 34, and the focus lever 33 is fixed to a rotation shaft of the lever gear 34. As shown in FIG. 1, the end of the focus lever 33 is exposed outside of the projector 1.

When the focus lever 33 is operated, the focus gear 36 is rotated via the lever gear 34 and the idler gear 35. When the focus gear 36 is rotated, each of the plurality of lenses composing the first optical system 70 disposed in the projection lens unit 31 can be moved to a given direction to adjust a focal point of a projection image.

Further, the lens holder 32 includes, for example, four threaded through-holes so that the second optical unit 40 can be fixed with the first optical unit 30 using screws, in which a screw 48 is screwed into each of the threaded through-holes 32c1 to 32c3. FIG. 9 shows three threaded through-holes 32c1 to 32c3, and the screw 48 is inserted into each of the threaded through-holes 32c1 to 32c3. In FIG. 9, the end of the screw 48 is shown. Further, positioning protruded members 32d1 to 32d3 are respectively formed around each of the threaded through-holes 32c1 to 32c3, in which each of the positioning protruded members 32d1 to 32d3 protrudes from the face of the lens holder 32. FIG. 9 shows the positioning protruded members 32d1 to 32d3.

Figure 10:
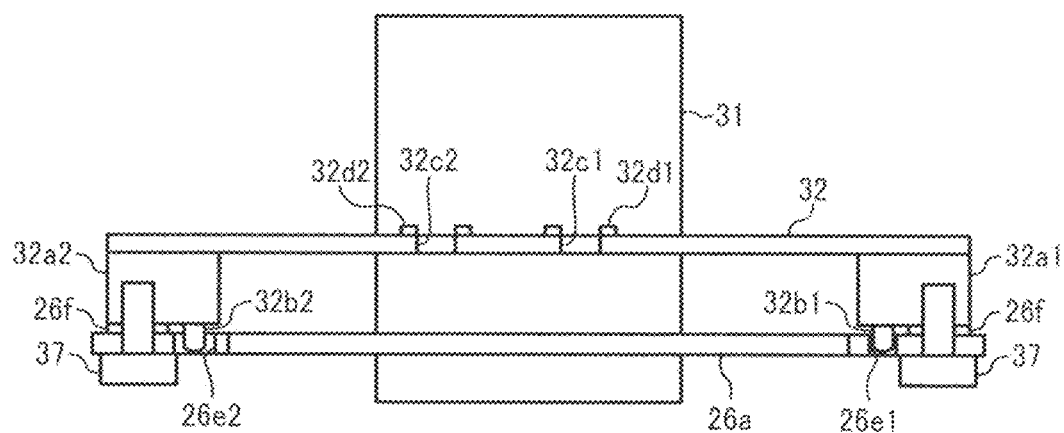
FIG. 10 shows a cross-sectional view along a line D-D of FIG. 9.

FIG. 10 shows a cross-sectional view along a line D-D of FIG. 9. As shown in FIG. 10, each of the legs 32a1 and 32a2 is disposed with positioning protruded members 32b1 and 32b2, respectively. The positioning protruded member 32b1 (right side in FIG. 10) is inserted in the position-setting hole 26e1 having the circular hole shape, which is the primary position-setting hole disposed on the top face 26b of the lighting unit bracket 26. The positioning protruded member 32b2 (left side in FIG. 10) is inserted in the position-setting hole 26e2 having the slot hole shape, which is the secondary position-setting hole. With this configuration, the position in the Z direction and X direction can be set correctly.

Further, a screw 37 is inserted into each of the through-holes 26c1 to 26c4 disposed for the top face 26b of the lighting unit bracket 26, and then screwed into screw holes of each of the legs 32a1 to 32a4 of the lens holder 32, by which the first optical unit 30 can be fixed to the lighting unit 20 with a correct position.

The second optical unit 40 includes a mirror holder 45 (see FIG. 12) that covers a portion of the projection lens unit 31 above the lens holder 32 to be described later. Further, as shown in FIG. 3, a space between a part of the lens holder 32, lower than a part of the lens holder 32 corresponding to the projection lens unit 31 and the top face 26b of the lighting unit bracket 26 of the lighting unit 20 is exposed outside. However, because the projection lens unit 31 engages the lens holder 32, the light does not enter the light path of projection light from such exposed part.

Figure 11:
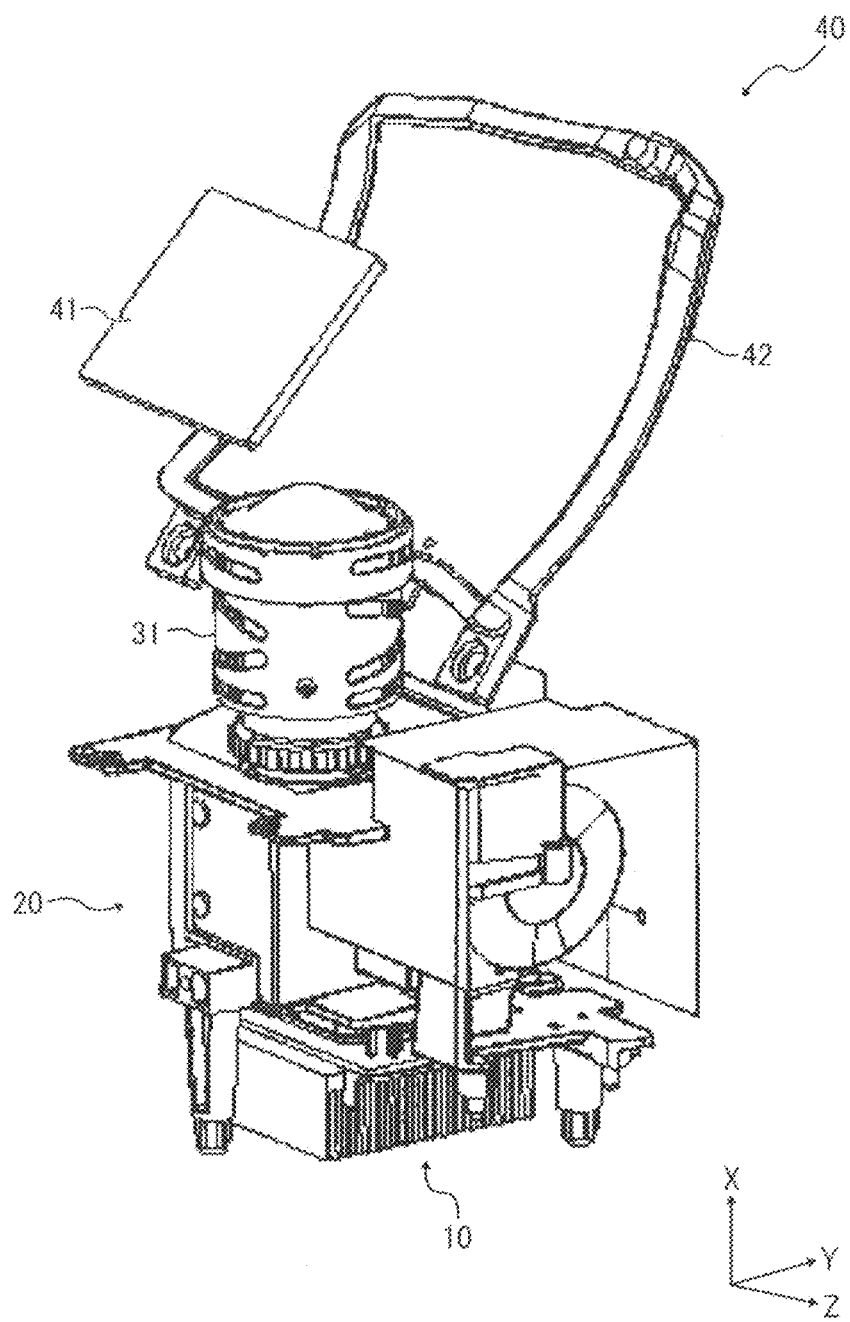
FIG. 11 shows a perspective view of a second optical unit configured with a projection lens unit, the lighting unit, and the image generation unit.
Figure 12:
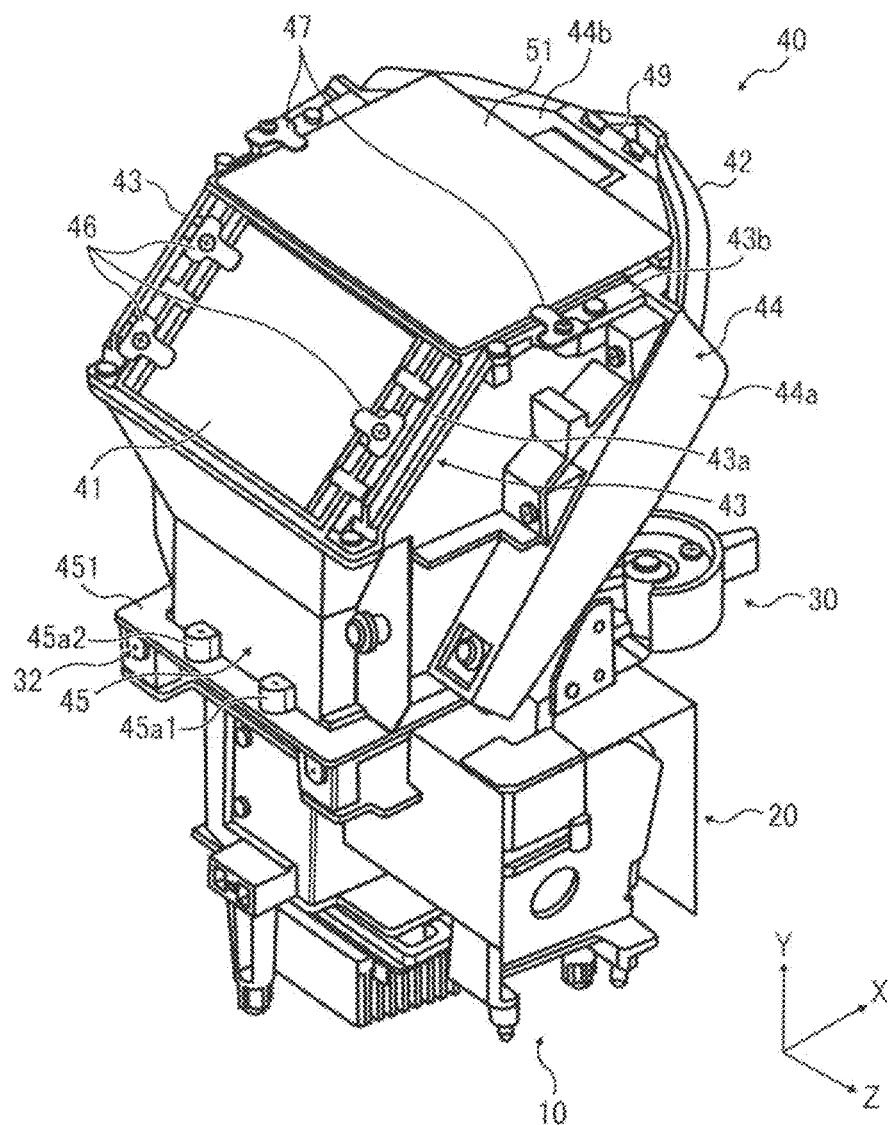
FIG. 12 shows a perspective view of the second optical unit configured with the first optical unit, the lighting unit, and the image generation unit.

A description is given of the second optical unit 40 with reference to FIGS. 11 and 12. FIG. 11 shows a perspective view of the second optical unit 40 used as a second optical system configured with the projection lens unit 31, the lighting unit 20, and the image generation unit 10. As shown in FIG. 11, the second optical unit 40 includes, for example, the reflection mirror 41, and the curved mirror 42 having the concave shape. The reflection face of the curved mirror 42 can be finished as a circular face, a rotation symmetrical non-circular face, a free curve shape, or the like.

FIG. 12 shows a perspective view of the second optical unit 40 with the first optical unit 30, the lighting unit 20, and the image generation unit 10. The second optical unit 40 passes the light reflected from the curved mirror 42, and includes the transparent glass 51 to prevent intrusion of dust to optical parts in the projector 1.

The second optical unit 40 includes, for example, a mirror bracket 43, a free mirror bracket 44, and a mirror holder 45. The mirror bracket 43 retains the reflection mirror 41 and the transparent glass 51. The free mirror bracket 44 retains the curved mirror 42. The mirror holder 45 holds the mirror bracket 43 and the free mirror bracket 44.

The mirror holder 45 has a box-like shape while the upper side, lower side, and one side such as right side in the X direction in FIG. 12 are opened, and thereby the mirror holder 45 has a U-like shape when viewed from the top. The upper part of the mirror holder 45 includes an inclined portion extending along a direction set between the middle of the X and Y directions by increasing the height, and includes a parallel face parallel to the X direction. The inclined portion is disposed at a proximal side of the parallel face in the X direction. Further, the peripheral side of upper opening of the mirror holder 45 disposed at a proximal side in the X direction and extending in the Z direction is parallel to the Z direction in FIG. 12.

The mirror bracket 43 is attached to the upper part of the mirror holder 45. The mirror bracket 43 includes an inclined side 43a and a horizontal side 43b. The inclined side 43a rises along a direction set between the middle of the X and Y directions by increasing the height as shown in FIG. 12. The horizontal side 43b extends in a direction parallel to the X direction in FIG. 12. The inclined side 43a contacts the peripherals of the inclined portion of the mirror holder 45, and the horizontal side 43b contacts the peripherals of the horizontal part of the mirror holder 45, which is the top of the mirror holder 45. The inclined side 43a includes an opening, and the reflection mirror 41 is retained to cover the opening of the inclined side 43a. The horizontal side 43b includes an opening, and the transparent glass 51 is retained to cover the opening of the horizontal side 43b.

Each end of the reflection mirror 41 in the Z direction is pressed to the inclined side 43a of the mirror bracket 43 by the mirror pressing member 46 such as a leaf spring to hold the reflection mirror 41 at the inclined side 43a of the mirror bracket 43. For example, as shown in FIG. 12, one end of the reflection mirror 41 in the Z direction is fixed by the two mirror pressing members 46, and other end of the reflection mirror 41 in the Z direction is fixed by the one mirror pressing member 46.

Each end of the transparent glass 51 in the Z direction is pressed to the horizontal side 43b of the mirror bracket 43 by a glass pressing member 47 such as a leaf spring to hold the transparent glass 51 on the mirror bracket 43. Each end of the transparent glass 51 in the Z direction is retained by using one glass pressing member 47 at each end in the Z direction.

The free mirror bracket 44 to retain the curved mirror 42 includes an arm portion 44a at each side of the free mirror bracket 44, in which the arm portion 44a extends and inclines along a direction set between the middle of the X and Y directions as shown in FIG. 12. Further, the free mirror bracket 44 includes a link portion 44b that links such two arm portions 44a at the upper portion of the arm portions 44a. The arm portion 44a of the free mirror bracket 44 is attached to the mirror holder 45 so that the curved mirror 42 covers an opening of the mirror holder 45.

The curved mirror 42 pressed toward the link portion 44b of the free mirror bracket 44 by a free mirror pressing member 49 such as a leaf spring at a substantially center of one end side of the transparent glass 51. Further, each end side of the first optical system 70 in the Z direction in FIG. 12 is fixed to the arm portion 44a of the free mirror bracket 44 using a screw.

The second optical unit 40 is stacked and fixed on the lens holder 32 of the first optical unit 30. Specifically, the bottom side of the mirror holder 45 has a bottom face 451 that faces an upper face of the lens holder 32. The bottom face 451 has three screw stoppers 45a1 to 45a3 having tube-like shape, which can be fixed with the first optical unit 30 by screws. FIG. 12 shows the screw stoppers 45a1 and 45a2, and FIG. 5 shows the screw stopper 45a3. The second optical unit 40 is fixed to the first optical unit 30 using screws, in which the screw 48 is inserted into each of the threaded through-holes 32c1 to 32c3 provided for the lens holder 32 of the first optical unit 30, and screwed into each of the screw stoppers 45a1 to 45a3 to fix the second optical unit 40 to the first optical unit 30.

In such a configuration, the bottom face of the mirror holder 45 of the second optical unit 40 contacts the positioning protruded members 32d1 to 32d3 of the lens holder 32, by which the second optical unit 40 can be fixed at a correct position in the Y direction.

As shown in FIG. 12, when the second optical unit 40 is stacked and fixed on the lens holder 32 of the first optical unit 30, a portion of the projection lens unit 31 that is above the lens holder 32 is encased in the mirror holder 45 of the second optical unit 40. Further, when the second optical unit 40 is stacked and fixed on the lens holder 32, a space is set between the curved mirror 42 and the lens holder 32, and the idler gear 35 (FIG. 9) may be set in such space.

Figure 13:
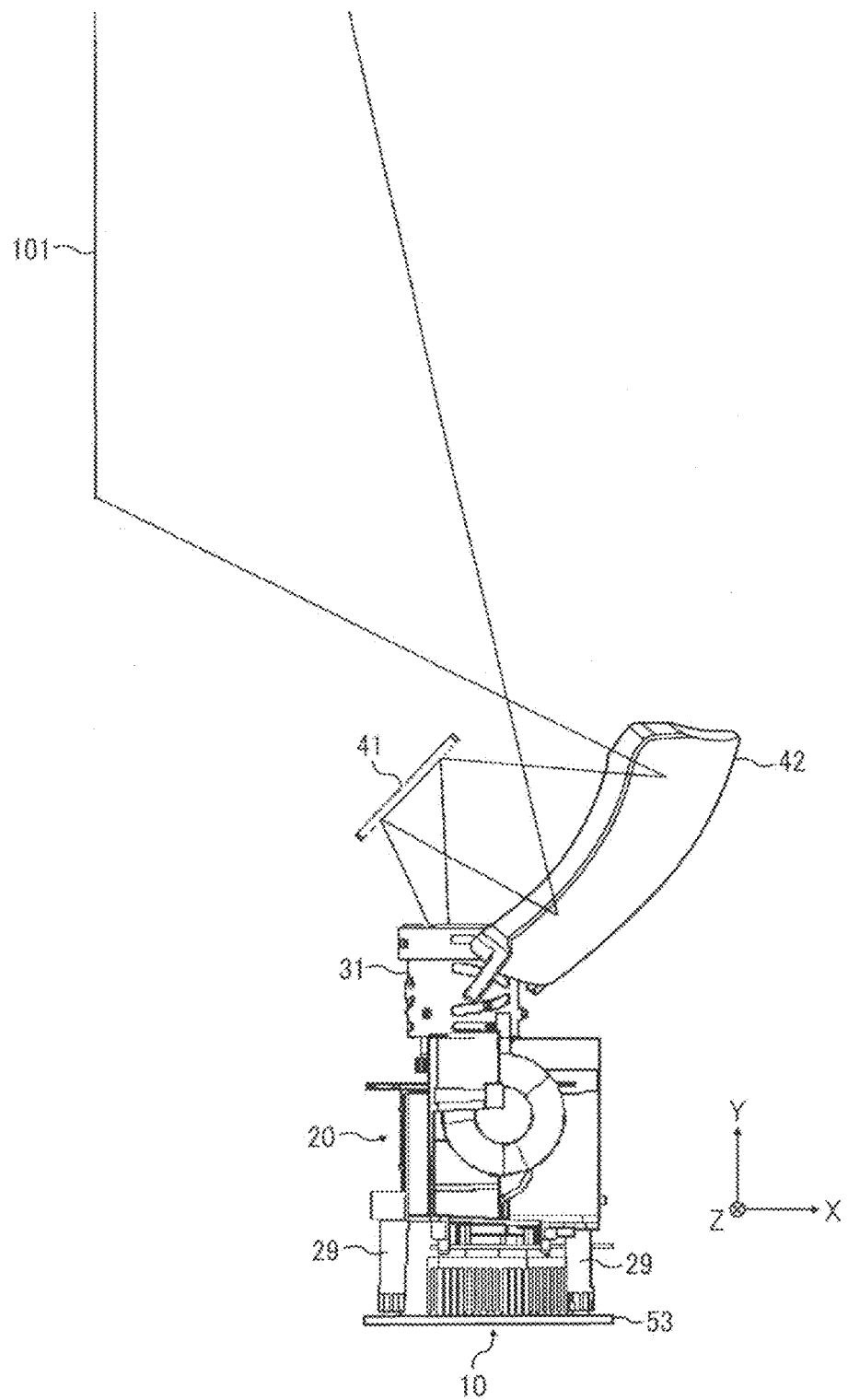
FIG. 13 shows a schematic view of the light path from the first optical system to a projection plane.

FIG. 13 shows a schematic view of the light path from the first optical system 70 to the projection plane 101 such as a screen. The light flux that has passed through the projection lens unit 31 configuring the first optical system 70 is used to generate an intermediate image between the reflection mirror 41 and the curved mirror 42, which is a conjugate image with respect to an image generated by the DMD 12. Such intermediate image is generated as a curved image between the reflection mirror 41 and the curved mirror 42. Such intermediate image enters the curved mirror 42 having a concave shape, and the curved mirror 42 enlarges the intermediate image and projects the enlarged image onto the projection plane 101.

As described above, an optical projection system can be configured with the first optical system 70, and the second optical system. In such a configuration, the intermediate image is generated between the first optical system 70 and the curved mirror 42 of the second optical system, and the intermediate image is enlarged and projected by the curved mirror 42, by which the projection distance to the screen can be set shorter. Therefore, the projector 1 can be used in small meeting rooms or the like.

Further, as shown in FIG. 13, the first optical unit 30 and the second optical unit 40 are stacked and fixed to the lighting unit bracket 26. Further, the image generation unit 10 is fixed to the lighting unit bracket 26. Therefore, the legs 29 of the lighting unit bracket 26 can be fixed to the base member 53 while supporting the weight of the first optical unit 30, the second optical unit 40, and the image generation unit 10.

Figure 14:
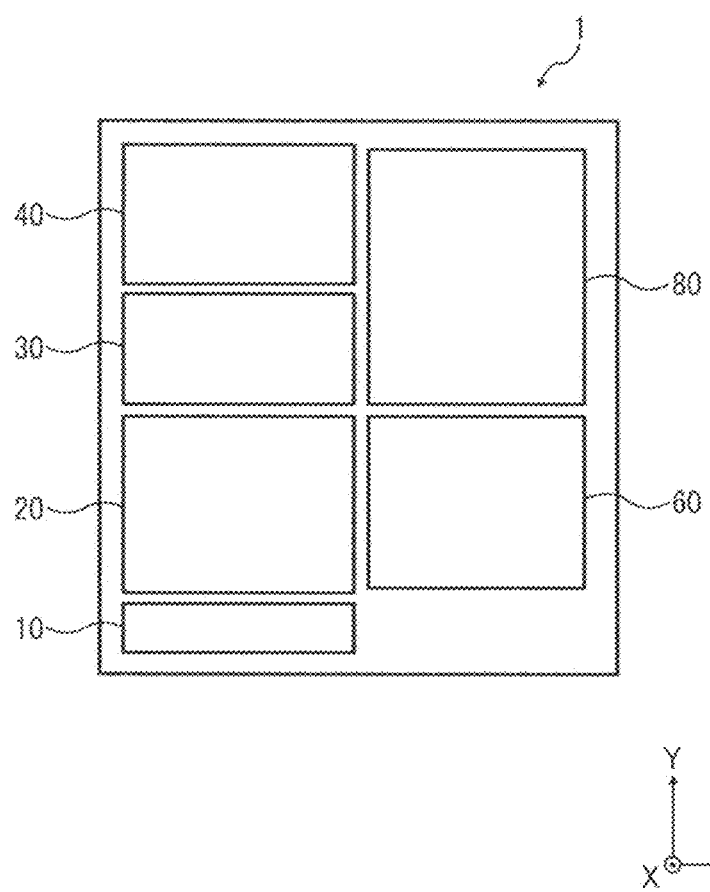
FIG. 14 schematically shows a layout of units in the projector.

FIG. 14 schematically shows a layout of units in the projector 1. As shown in FIG. 14, the image generation unit 10, the lighting unit 20, the first optical unit 30, and the second optical unit 40 are stacked along the Y direction, which is the short side direction of the projection plane 101. As shown in FIG. 14, the light source unit 60 is arranged in the Z direction with respect to other stacked units composed of the image generation unit 10, the lighting unit 20, the first optical unit 30, and the second optical unit 40, which is the long side direction of the projection plane 101.

As described above, in an example embodiment, the image generation unit 10, the lighting unit 20, the first optical unit 30, the second optical unit 40, and the light source unit 60 can be arranged along the Y direction and Z directions, which are parallel to a projection image and the projection plane 101.

Specifically, the projection optical system B having the first optical unit 30 and the second optical unit 40 is stacked on the image generator A having the image generation unit 10 and the lighting unit 20. The light source unit 60 is coupled to the image generator A in a direction perpendicular to the stacking direction of the image generator A and the projection optical system B. Further, the image generator A and the light source unit 60 can be arranged along a direction parallel to the base member 53. Further, the image generator A and the projection optical system B may be arranged along a direction perpendicular to the base member 53, in which the image generator A is disposed over the base member 53, and then the projection optical system B is disposed over the image generator A.

Further, as shown in FIG. 14, a power source unit 80 is stacked or disposed above the light source unit 60, wherein the power source unit 80 supplies power to the light source 61 and the DMD board 11. The light source unit 60, the power source unit 80, the image generator A, and the projection optical system B are encased in a casing of the projector 1. The casing of the projector 1 includes the top face of the projector 1, the base member 53, and an outer cover 59 (see FIG. 18) used as the side face of the projector 1 to be described later.

Figure 15:
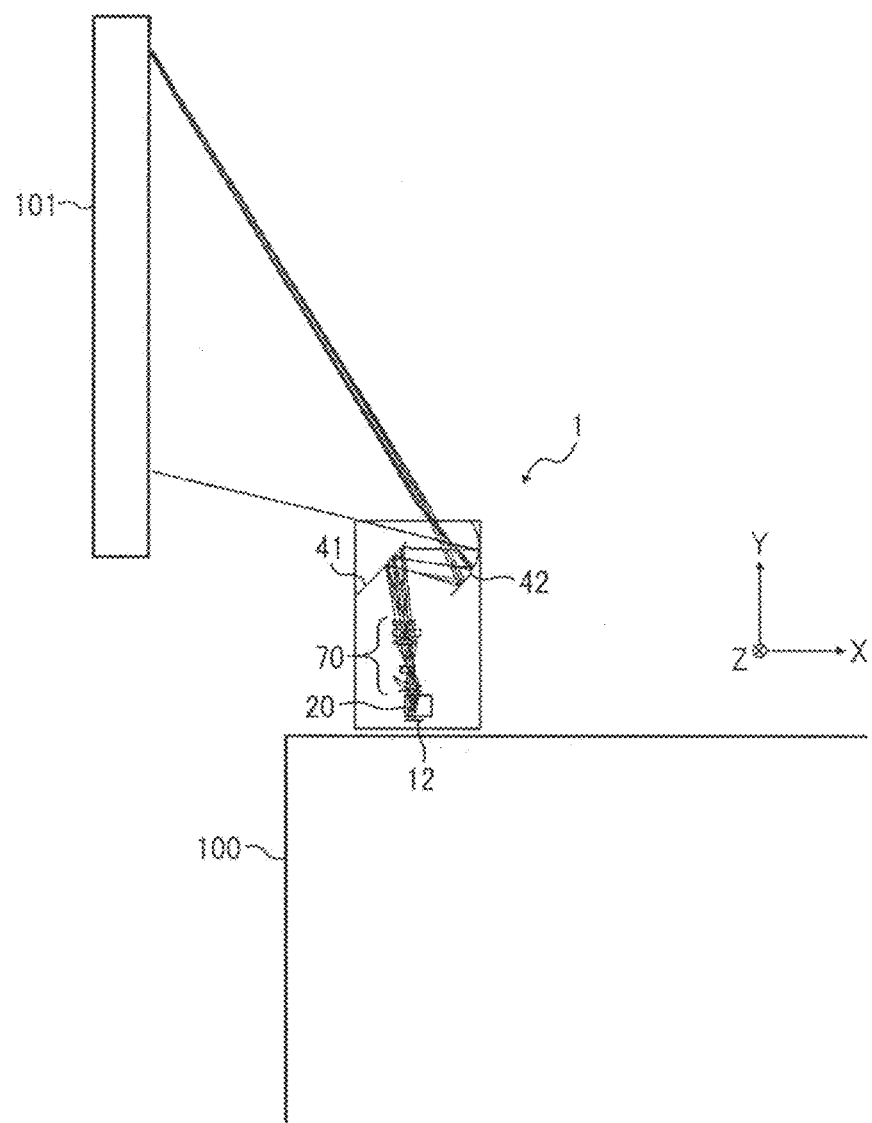
FIG. 15 shows an example of use environment of the projector according to an example embodiment.
Figure 16:
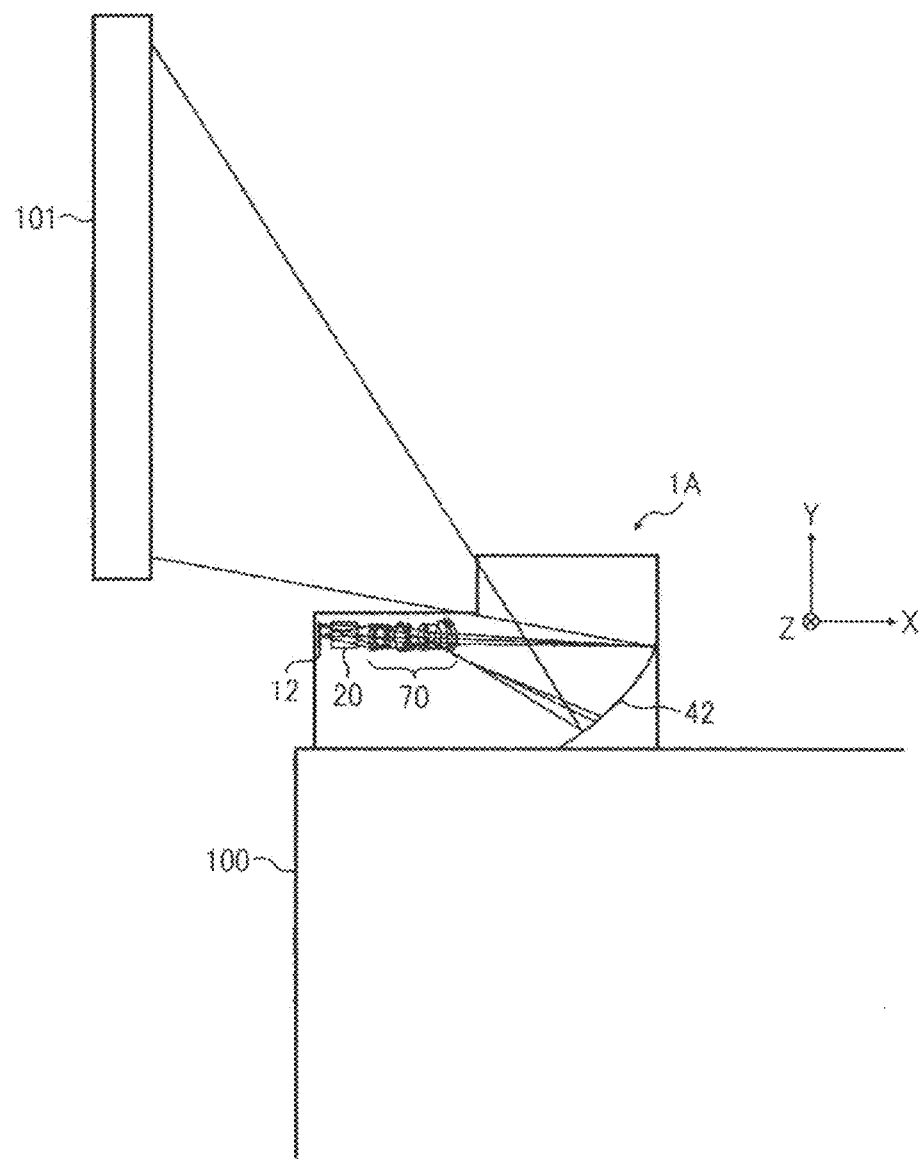
FIG. 16 shows an example of use environment of a conventional projector.
Figure 17:
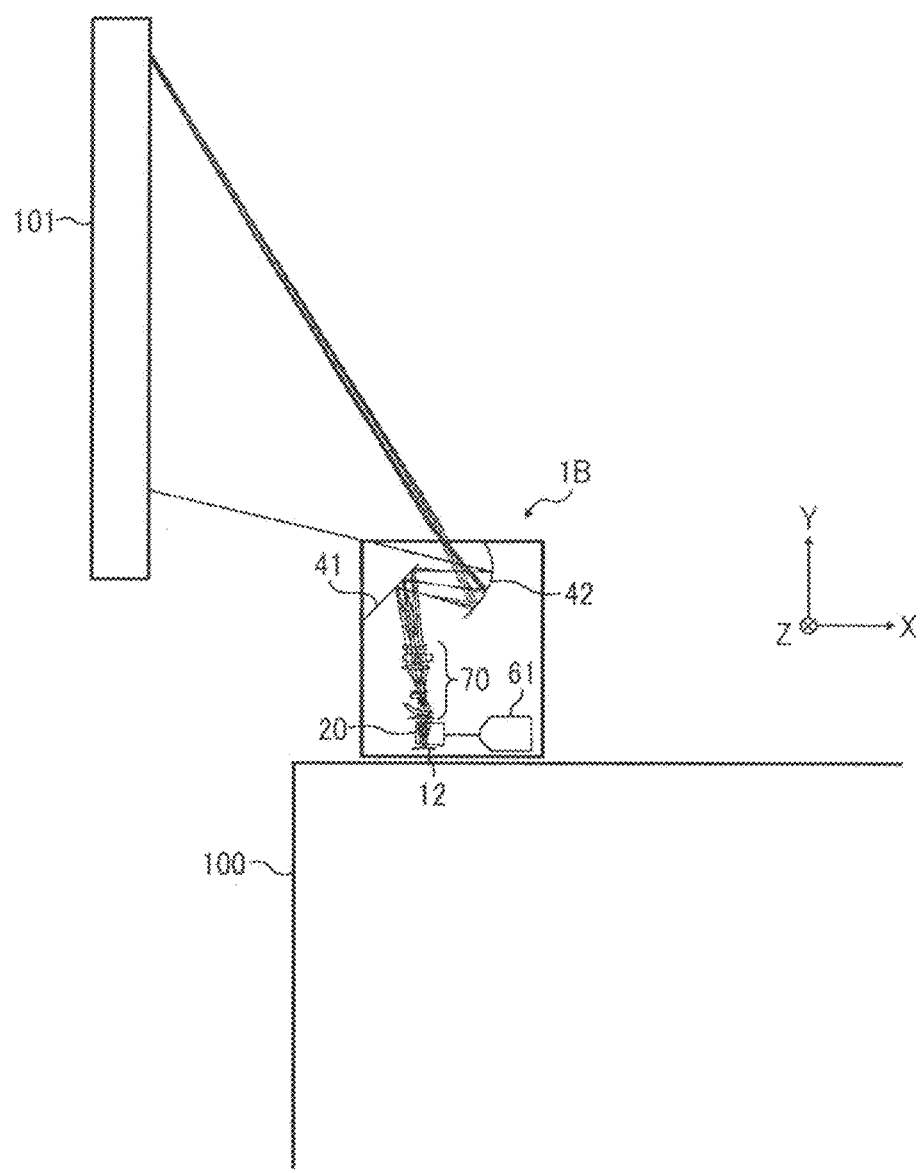
FIG. 17 shows another example of use environment of a conventional projector.

FIG. 15 shows an example of use environment of the projector 1 according to an example embodiment, and FIG. 16 and FIG. 17 show examples of use environment of conventional projectors 1A and 1B. As shown in FIGS. 15 to 17, when the projector is used in a meeting room, the projector may be placed on a table 100, and images are projected on the projection plane 101 such as a white board.

As shown in FIG. 16, as for the conventional projector 1A, the DMD 12, the lighting unit 20, the first optical system 70, and the second optical system such as the curved mirror 42 are serially arranged along in the direction perpendicular to the projection plane 101 to which a projection image is projected. Therefore, the length of the projector 1A in the direction perpendicular to the projection plane 101 (i.e., X direction) becomes longer, and thereby a greater space is required for the projector 1A in the direction perpendicular to the projection plane 101.

Typically, chairs that participants sit and desks that participants use may be arranged in the direction perpendicular to the projection plane 101 when to see images projected on the projection plane 101. Therefore, if a greater space for the projector 1A is required in the direction perpendicular to the projection plane 101, the arrangement space for chairs and the arrangement space for desks are restricted and thereby not convenient when the projector is used.

As shown in FIG. 17, as for the conventional projector 1B, the DMD 12, the lighting unit 20, and the first optical system 70 are serially arranged along in a direction parallel to the projection plane 101 to which a projection image is projected. Therefore, compared to the projector 1A shown in FIG. 16, the length of the projector 1B in the direction perpendicular to the projection plane 101 can be set shorter. However, as for the projector 1B of FIG. 17, the light source 61 is arranged in the direction perpendicular to the projection plane 101 and is arranged after the lighting unit 20 in the direction perpendicular to the projection plane 101, and thereby the length of the projector 1B in the direction perpendicular to the projection plane 101 may not be effectively set shorter.

As for the projector 1 of an example embodiment shown in FIG. 15, the image generator A having the image generation unit 10 and the lighting unit 20, and the projection optical system B having the first optical unit 30 and the reflection mirror 41 are serially arranged along in a direction parallel to the projection plane 101, to which a projection image is projected. In such a configuration, the image generator A and the projection optical system B are serially arranged along in a direction parallel to the Y direction in FIG. 15. Further, the light source unit 60 and the lighting unit 20 are serially arranged along in a direction parallel to the projection plane 101, which means the light source unit 60 and the lighting unit 20 are serially arranged along the Z direction in FIG. 15.

As described above, as for the projector 1 according to an example embodiment, the light source unit 60, the image generation unit 10, the lighting unit 20, the first optical unit 30, and the reflection mirror 41 can be arranged in a direction parallel to the projection plane 101 such as the Z direction or Y direction in FIG. 15. Further, the image generation unit 10, the lighting unit 20, the first optical unit 30, and the reflection mirror 41 may be arranged in a direction crossing the projection plane 101.

As described above, the light source unit 60, the image generation unit 10, the lighting unit 20, the first optical unit 30, and the reflection mirror 41 can be arranged in a direction parallel to the projection plane 101 such as the Z direction or Y direction in FIG. 15. Therefore, the length of the projector 1 in the direction perpendicular to the projection plane 101 (i.e., X direction in FIG. 15) can be set shorter than the length of the projectors 1A and 1B shown in FIGS. 16 and 17. With this configuration, the projector 1 may not cause problems when arranging a space for chairs and desks, by which the projector 1 having a good enough level of convenience can be devised.

Further, as shown in FIG. 14, the power source unit 80 is stacked or disposed above the light source unit 60 to supply power to the light source 61 and the DMD board 11, by which the length of the projector 1 in the Z direction can be set shorter.

Further, although the second optical system may be configured with the reflection mirror 41 and the curved mirror 42, but the second optical system can be configured with only the curved mirror 42. Further, the reflection mirror 41 can be a plane mirror, a mirror having a positive refractive power, and a mirror having a negative refractive power. Further, the curved mirror 42 may be a concave mirror or a convex mirror. When the curved mirror 42 is a convex mirror, the first optical system 70 is configured in a way so that no intermediate image is generated between the first optical system 70 and the curved mirror 42.

Because the light source 61 has a lifetime for effective use, the light source 61 is required to be replaced with a new one periodically. Therefore, the light source unit 60 is detachably attached to a body of the projector 1.

Figure 18:
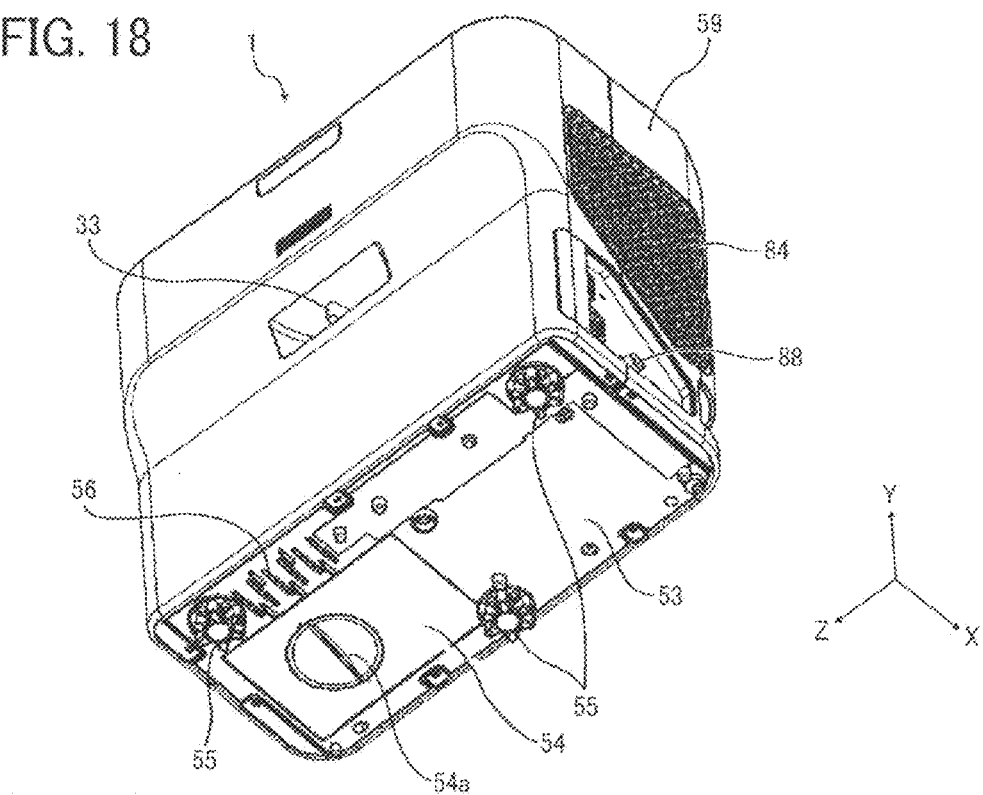
FIG. 18 shows a perspective view of the projector viewed from a bottom face of the projector.

FIG. 18 shows a perspective view of the projector 1 viewed from a bottom face of the projector 1, wherein the bottom face may be placed on a table. As shown in FIG. 18, the bottom face of the projector 1 includes the base member 53 and the openably closable cover 54. The openably closable cover 54 includes a rotate-able member 54*a*. When the rotate-able member 54*a* is rotated, the openably closable cover 54 is unlocked from the body of the projector 1, by which the openably closable cover 54 can be removed from the body of the projector 1. Further, the base member 53 includes, for example, a power-source air intake port 56 at a position next to the openably closable cover 54 in the X direction.

Further, as shown in FIG. 18, an air-intake port 84 and the input unit 88 are disposed on one Y-X plane of the outer cover 59 of the projector 1. The input unit 88 is used to input image data from external apparatuses such as personal computers.

Figure 19:
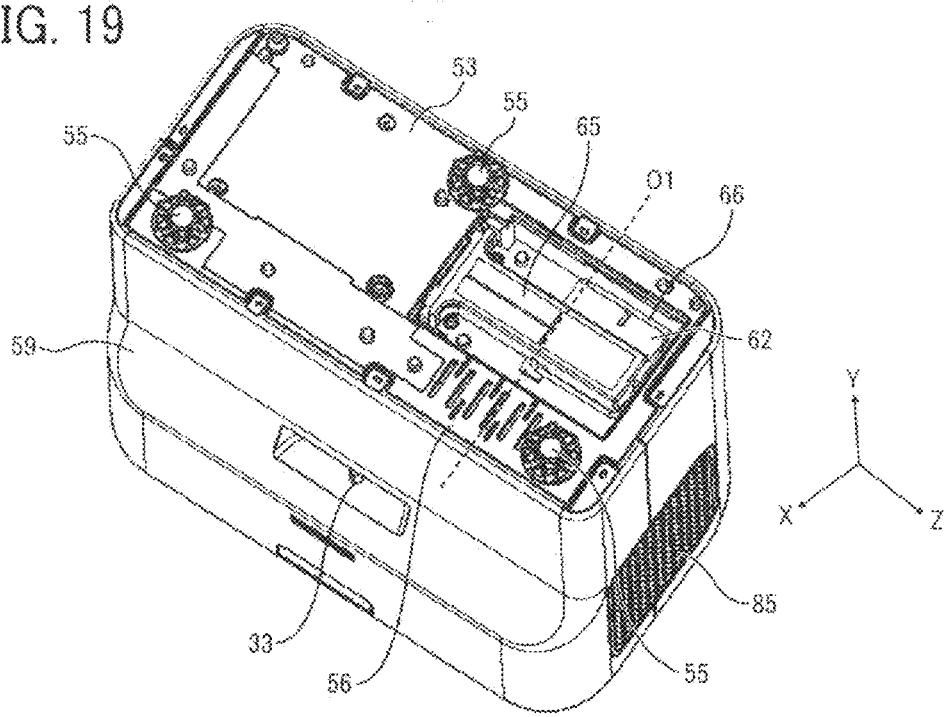
FIG. 19 shows a perspective view of the projector when an openably closable cover is removed from the projector.

FIG. 19 shows a perspective view of the projector 1 when the openably closable cover 54 is removed from the projector 1. When the openably closable cover 54 is removed, the light-source bracket 62 of the light source unit 60 is exposed, wherein the exposed side is the opposite side that the light source 61 is attached. The light-source bracket 62 includes a knob 66, which is pivotable about the pivot center O1 indicated by a dotted line in FIG. 19.

When removing the light source unit 60 from the body of the projector 1, the knob 66 is pivoted and opened by picking the knob 66, by which the light source unit 60 can be removed from an opening of the body of the projector 1. When attaching the light source unit 60 into the body of the projector 1, the light source unit 60 is inserted into the body of the projector 1 through the opening.

When the light source unit 60 is inserted into the body of the projector 1, the connector 62*a* (FIG. 4) is connected with a power-source connector in the body of the projector 1, and the three light source position-setting members 64*a*1 to 64*a*3 of the holder 64 (FIG. 4) engage with three light source positioning members 26*a*1 to 26*a*3 (FIG. 6) disposed for the lighting unit bracket 26 of the lighting unit 20, by which the light source unit 60 is set at a correct position in the body of the projector 1, and the attachment of the light source unit 60 completes. Then, the openably closable cover 54 is attached to the base member 53. As described above, the knob 66 is provided for the light source unit 60, but the pass-through area 65 shown in FIG. 19, which protrudes to the openably closable cover 54 can be used as a knob.

Further, the base member 53 is disposed with three legs 55. By rotating the legs 55, the protruded length of the legs 5 from the base member 53 can be changed, by which the height adjustment in the Y direction of the projector 1 can be conducted.

Further, as shown in FIG. 19, an exhaust port 85 is disposed at other Y-X plane of the outer cover 59.

Figure 20:
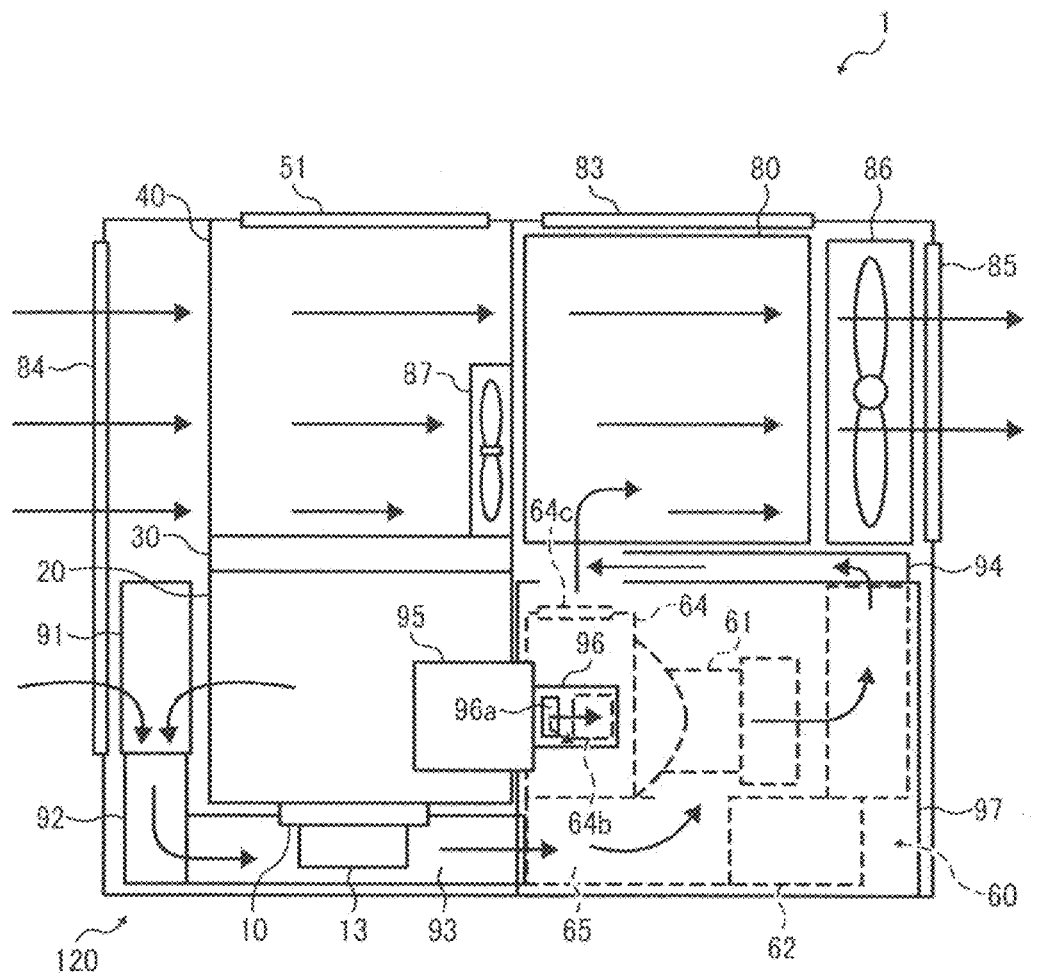
FIG. 20 shows a schematic view of airflow patterns in the projector.

FIG. 20 shows a schematic view of airflow patterns in the projector 1 according to an example embodiment. FIG. 20 shows the projector 1 viewed from the X direction, wherein the X direction is perpendicular to the projection plane 101. As shown in FIG. 20, the projector 1 includes the air-intake port 84 disposed its one face (left side in FIG. 20), and the exhaust port 85 disposed its other face (right side in FIG. 20). The air-intake port 84 has an opening to intake external air into the projector 1. The exhaust port 85 has an opening to exhaust air from the projector 1. Further, an exhaust fan 86 is disposed at a position facing the exhaust port 85.

When the projector 1 is viewed from the X direction, which is a direction perpendicular to the projection plane 101, a part of the exhaust port 85 and a part of the air-intake port 84 may be disposed between the light source unit 60 and the operation unit 83.

Further, a flow path is set between a rear face of the curved mirror 42 and the outer cover 59 facing the rear face of the curved mirror 42 so that air can flow in such space. With this configuration, the external air taken from the air-intake port 84 can flow through along the Z-Y plane of the mirror holder 45 of the second optical unit 40 (see FIG. 12), and the rear face of the curved mirror 42 by following the mirror holder 45 and curving of the rear face of the curved mirror 42, and then flow to the exhaust port 85.

Further, the curved mirror 42 is a concave-shaped mirror having the positive refractive power as above mentioned, and thereby the rear face of the curved mirror 42 has a convex shape. When the power source unit 80 disposed over the light source unit 60 is viewed from the Z direction in FIG. 20, the power source unit 80 can be viewed as a U-shaped configuration without the side facing the light source unit 60. Further, the external air taken from the air-intake port 84 flows along the mirror holder 45 and the curving of the rear face of the curved mirror 42 to the exhaust port 85, and then flows to a space encircled by the power source unit 80 at three sides excluding the light source unit 60 side, and is then exhausted from the exhaust port 85.

As described above, the part of the exhaust port 85 and the air-intake port 84 are disposed between the light source unit 60 and the operation unit 83 when the projector 1 is viewed from the X direction, which is a direction perpendicular to the projection plane 101. In such a configuration, an airflow passing through a space between the light source unit 60 and the operation unit 83 and exhausted from the exhaust port 85 can be generated.

Further, a light source blower 95 is disposed at a position that can suck air around the color motor 21*a* (FIG. 5) that drives the color wheel 21 in the lighting unit 20. With this configuration, the color motor 21*a* and the light tunnel 22 can be cooled using the airflow generated by the light source blower 95.

The air sucked in by the light source blower 95 passes a light source duct 96, and then flows into a light-source air supply port 64*b* (FIG. 4) of the holder 64. Further, a part of the air flowing into the light source duct 96 flows into a space between a light source housing 97 and the outer cover 59 from an opening 96*a* formed on a face of the light source duct 96 opposing the outer cover 59 (FIG. 19).

The air flowing into the space between the light source housing 97 and the outer cover 59 from the opening 96*a* of the light source duct 96 cools the light source housing 97 and the outer cover 59, and is then exhausted from the exhaust port 85 using the exhaust fan 86.

Further, the air flowing to the light-source air supply port 64*b* flows into the light source 61 to cool the light source 61, and is then exhausted from the light-source air exhaust port 64*c* disposed on the top face of the holder 64. The air exhausted from the light-source air exhaust port 64*c* is then exhausted from an opening formed on the top face of the light source housing 97 to a space encircled by the power source unit 80. Then, the air exhausted from the light source housing 97 (i.e., high-temperature air) is mixed with external air (i.e., low-temperature air) that flows around the second optical unit 40 and then flows into the space encircled by the power source unit 80, and then the mixed air is exhausted from the exhaust port 85 using the exhaust fan 86.

As described above, the high-temperature air exhausted from the light-source air exhaust port 64*c* is mixed with the external air (i.e., low-temperature air), and then exhausted from the exhaust port 85. Therefore, exhausting of the high-temperature air from the exhaust port 85 can be prevented, and the temperature of air exhausted from the exhaust port 85 can be decreased to a lower temperature. The details of mixing air exhausted from the light-source air exhaust port 64c and air taken from the air-intake port 84 will be described later.

Further, the operation unit 83 is preferably disposed on a top face of the projector 1 so that the user can operate the operation unit 83 easily. Because the projector 1 includes the transparent glass 51 on its top face for projecting images on the projection plane 101, the operation unit 83 may be disposed on a position corresponding to the light source 61 when viewing the projector 1 from the Y direction.

As described above, the low-temperature airflow flowing through a space between the light source unit 60 and the operation unit 83 from the air-intake port 84 to the exhaust port 85 can cool the high-temperature air, which has become high temperature when the air has cooled the light source 61, by which the low-temperature air and high-temperature air become a mixed air. Such mixed air is then exhausted from the exhaust port 85, and thereby the movement of high temperature air to the operation unit 83 can be prevented.

With this configuration, the temperature increase of the operation unit 83, which may be caused by the air having high temperature by cooling the light source 61, can be prevented. Further, a part of air flowing from the air-intake port 84 to the exhaust port 85 flows around the second optical unit 40 and then under the operation unit 83 to cool the operation unit 83. Therefore, the temperature increase of the operation unit 83 can be prevented.

Further, when the exhaust fan 86 sucks in air, external air can be sucked from the power-source air intake port 56 disposed on the base member 53 (FIG. 19). A ballast board to supply power or current to the light source 61 is disposed at a position distal of the light source housing 97 in the X direction of FIG. 20. The external air sucked from the power-source air intake port 56 can flow through a space between the light source housing 97 and the ballast board in the upward direction to cool the ballast board. Then, the air flows to a space encircled by the power source unit 80, disposed over the ballast board, and is then exhausted from the exhaust port 85 using the exhaust fan 86.

Further, a cooling unit 120 to cool the heat sink 13 of the image generation unit 10 and the light-source bracket 62 of the light source unit 60 is disposed at the lower left side of the projector 1 as shown in FIG. 20. The cooling unit 120 includes, for example, an air-intake blower 91, a vertical duct 92 disposed under the air-intake blower 91, and a horizontal duct 93 connected at the bottom of the vertical duct 92.

The air-intake blower 91 is disposed at a lower side of the air-intake port 84 while facing the air-intake port 84. The air-intake blower 91 sucks external air from the air-intake port 84 via a side face of the air-intake blower 91 facing the air-intake port 84, and also sucks air from the body of the projector 1 from another side, opposite the side face of the air-intake blower 91 facing the air-intake port 84. Such sucked airflows in the vertical duct 92 disposed under the air-intake blower 91. The air flowing into the vertical duct 92 flows downward, and then flows to the horizontal duct 93 connected at the bottom of the vertical duct 92.

As shown in FIG. 20, the heat sink 13 is present in the horizontal duct 93. Therefore, the heat sink 13 can be cooled by the air flowing in the horizontal duct 93. By cooling the heat sink 13, the DMD 12 can be cooled effectively and efficiently, by which high temperature of the DMD 12 can be prevented.

The air flowing through the horizontal duct 93 flows into the pass-through area 65 or the opening 65a disposed for the light-source bracket 62 of the light source unit 60 (FIG. 4). The air flowing into the opening 65a flows through a space between the openably closable cover 54 and the light-source bracket 62, and cools the openably closable cover 54.

Meanwhile, the air flowing into the pass-through area 65 cools the light-source bracket 62, and then flows into a space opposite the light exit side of the light source 61 to cool a face of a reflector so that the reflector of the light source 61 is cooled, in which the face of the reflector cooled by the air is a face opposite the reflection face of the reflector. Therefore, the air that passes through the pass-through area 65 can take heat from both of the light-source bracket 62 and the light source 61.

The air, which has passed near the reflector, passes through an exhaust duct 94, which is used to guide the air from the top side of the light-source bracket 62 to the lower side of the exhaust fan 86, and then converges into the air exhausted from the light-source air exhaust port 64c, and then flows to the exhaust port 85, and then the air can be exhausted from the exhaust port 85 using the exhaust fan 86.

Further, the air flowing into a space between the openably closable cover 54 and the light-source bracket 62 through the opening 65a cools the openably closable cover 54, and then flows inside the projector 1, and is then exhausted from the exhaust port 85 using the exhaust fan 86.

As described above, the light-source bracket 62 can be cooled by providing the pass-through area 65 for the light-source bracket 62. By cooling light-source bracket 62, the temperature increase of the light source 61 can be prevented. Therefore, the light source 61 can be cooled effectively even if the flow rate of cooling air flowing into the light source 61 is decreased. If the flow rate of cooling air is decreased, the revolutions per minute (rpm) of the light source blower 95 can be reduced, by which wind noise of the light source blower 95 can be suppressed. Further, by reducing the revolutions per minute (rpm) of the light source blower 95, the power-saving of the projector 1 can be enhanced.

A description is given of mixing of air exhausted from the light-source air exhaust port 64c, which may be called as light-source exhaust air, and air taken from the air-intake port 84, which may be called as low-temperature air The light-source exhaust air may be also referred to as hot-air exhaust, which is exhausted from the light source.

Figure 21:
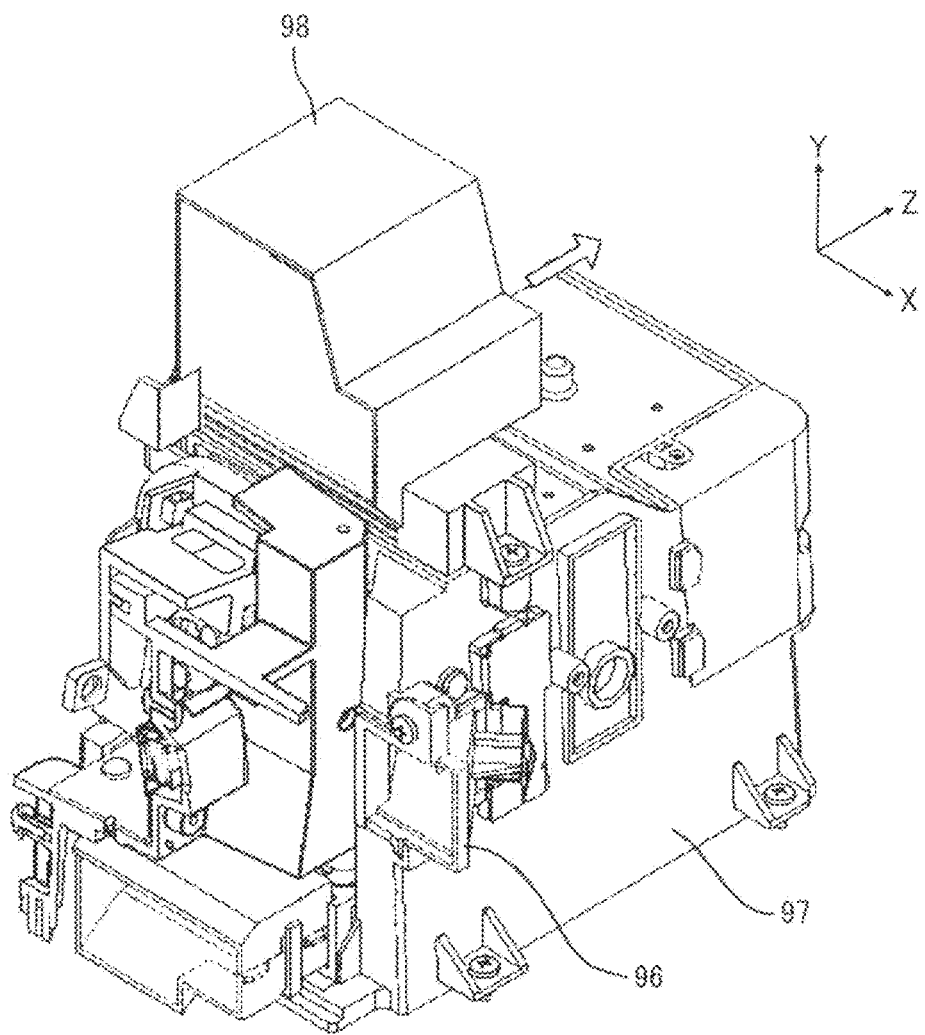
FIG. 21 shows a perspective view of a mixing duct and a light source housing.

FIG. 21 shows a perspective view of a mixing duct 98 with the light source housing 97. The mixing duct 98 is an example of a mixing unit to mix the hot-air exhaust (or high-temperature air) and the low-temperature air. As shown in FIG. 21, the mixing duct 98 is disposed over the light source housing 97. The mixing duct 98 has an opening at each side in the Z direction.

Figure 22:
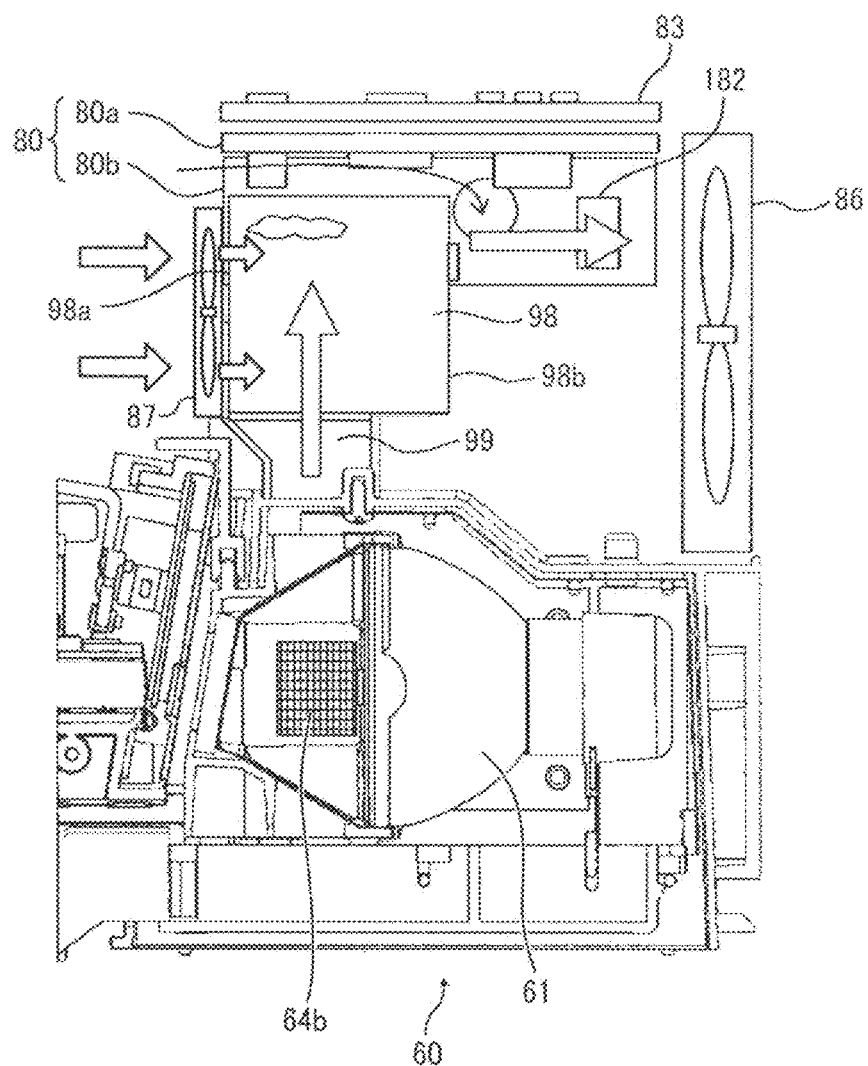
FIG. 22 shows a cross-sectional view of a light source unit, a power source unit, and a mixing duct 98.

FIG. 22 shows a cross-sectional view of the light source unit 60, the power source unit 80, and the mixing duct 98. As shown in FIG. 22, a light-source exhaust duct 99 is disposed in the light source housing 97. The light-source exhaust duct 99 guides the hot-air exhaust in the vertical upward direction to send the hot-air exhaust into the mixing duct 98. The light-source exhaust duct 99 can be used as a first flow path.

One end (or lower end) of the light-source exhaust duct 99 is connected to an opening of the light source housing 97, which is set just above the light-source air exhaust port 64c of the holder 64, and other end (or upper end) of the light-source exhaust duct 99 is connected to an opening set on the bottom face of the mixing duct 98. The mixing duct 98 is disposed in a space encircled by the power source unit 80. FIG. 22 shows a power factor correction (PFC) main power source board 80a, and a PFC sub-power source board 80b of the power source unit 80. Further, the operation unit 83 is disposed over the PFC main power source board 80a. Further, a thermo switch 182 is disposed at the exhaust fan 86 side of the PFC sub-power source board 80b (right side in FIG. 22). When the thermo switch 182 detects a given temperature or more, the power voltage supply to the power source unit 80 is stopped.

The hot-air exhaust exhausted from the light-source air exhaust port 64c of the holder 64 increases its temperature when the air takes heat from the light source 61. As shown in FIG. 22, such hot-air exhaust rises in the light-source exhaust duct 99, and hits a upper-side face (or wall face) of the mixing duct 98 with the effect of the updraft force of the hot-air exhaust, the suction power of the exhaust fan 86, and the wind pressure of the light source blower 95.

As shown in FIG. 22, the mixing duct 98 has openings such as an inflow port 98a and an outflow port 98b that define a second flow path. In the present embodiment, the inflow port 98a is disposed at the left side of the mixing duct 98, and the outflow port 98b is disposed at the exhaust fan 86 side of the mixing duct 98 as shown in FIG. 22. Further, an intermediary fan 87 is disposed at the upstream side of the inflow port 98a to move air from the inflow port 98a to the mixing duct 98. A part of the low-temperature air flowing from the air-intake port 84 into a space around the second optical unit 40 further flows into the mixing duct 98 via the inflow port 98a by the intermediary fan 87 along the second flow path, and is then mixed with the hot-air exhaust that hits the upper-side face or wall face of the mixing duct 98. With this mixing process, the hot-air exhaust decreases its temperature, and the mixed-air (hereinafter, first mixed-air) flows toward the exhaust fan 86.

Further, the first mixed-air flows out of the outflow port 98b of the mixing duct 98, and is then mixed with air that is taken from the air-intake port 84 between the outflow port 98b and the exhaust port 85. Such air, which does not flow into the second flow path from the inflow port 98a, comes from the outer peripheral sides (e.g., upper side, other sides) of the mixing duct 98. Such further mixed-air (hereinafter, second mixed-air) is thus cooled further, and the second mixed-air is exhausted from the exhaust fan 86 to the outside of the projector 1.

Depending on the pressure and flow rate of the hot-air exhaust flowing into the mixing duct 98 from the light-source exhaust duct 99, the internal pressure of the mixing duct 98 can become high enough to prevent low-temperature air from flowing into the mixing duct 98 from the inflow port 98a. In such a situation, the low-temperature air taken from the air-intake port 84 may not flow into the inflow port 98a but may more likely flow to the outflow port 98b without entering the inflow port 98a. Therefore, the low-temperature air may not flow into the mixing duct 98 from the inflow port 98a with enough amounts, by which the hot-air exhaust cannot be mixed with the low-temperature air in the mixing duct 98 effectively, and thereby the cooling of the hot-air exhaust may not be effectively conducted. If the hot-air exhaust cannot be cooled with the low-temperature air in the mixing duct 98 effectively, the air is exhausted from the outflow port 98b of the mixing duct 98 and mixed with low-temperature air not entering the inflow port 98a, in which the air exhausted from the outflow port 98b may not be cooled effectively and then exhausted from the projector 1.

In view of such situation, the intermediary fan 87 is disposed to flow the low-temperature air into the mixing duct 98 from the inflow port 98a, by which even if the internal pressure of the mixing duct 98 becomes high, the low-temperature air can be forcibly flowed into the mixing duct 98 from the inflow port 98a using the intermediary fan 87.

With this configuration, insufficient flow of the low-temperature air to the mixing duct 98 from the inflow port 98a can be prevented, and insufficient cooling of the hot-air exhaust by the low-temperature air in the mixing duct 98 can be prevented.

With this configuration, the mixed air cooled effectively in the mixing duct 98 and exhausted from the outflow port 98b can be further mixed with low-temperature air taken from the air-intake port 84 and not flowing into the inflow port 98a, by which the mixed air exhausted from the outflow port 98b can be cooled effectively and exhausted from the projector 1.

By disposing at least one intermediary fan 87 at the upstream side of air flow with respect to the inflow port 98a, the low-temperature air can be flowed into the mixing duct 98 from the inflow port 98a effectively.

Figure 23:
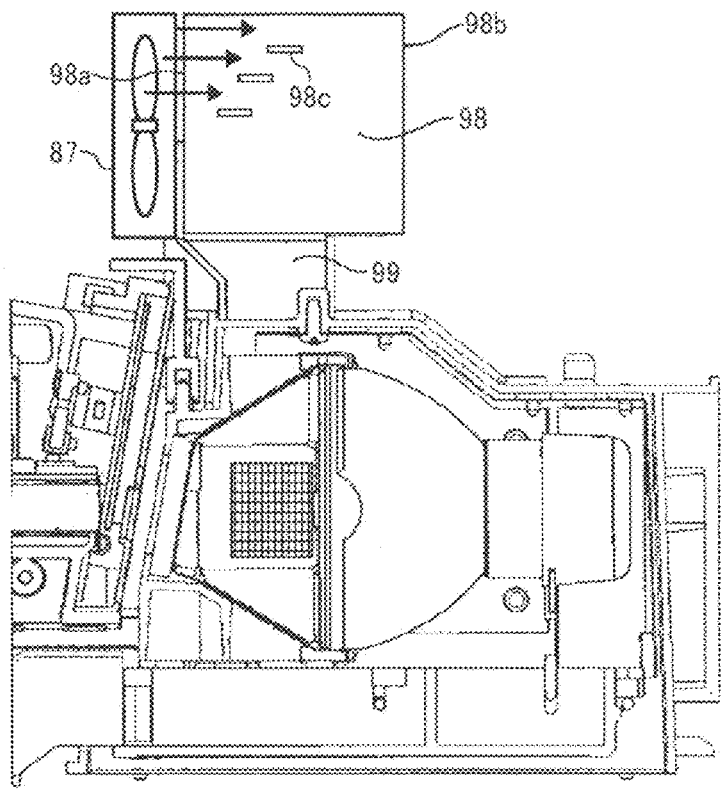
FIG. 23 shows a mixing duct provided with a plurality of plate members.

Further, as shown in FIG. 23, a plurality of plate members 98c can be disposed in the mixing duct 98. The plate member may be also referred to a fin. Each of the plurality of plate members 98c may be disposed in parallel to the horizontal direction while setting a given interval in the vertical direction with each other. The plate members 98c are set at positions shifted in the horizontal direction, which is the inflow direction of the low-temperature air. Specifically, the plate member 98c disposed at the upper position is set at a position closer to the exhaust port 85, and the plate member 98c disposed at the lower position is set at a position far from the exhaust port 85. Therefore, as shown in FIG. 23, the positions of the plurality of plate members 98c becomes higher as the positions of plate members 98c becomes closer to the closer to the exhaust port 85.

In the configurations of FIGS. 21 and 22, the layer of high temperature air may be generated at the upper part of the mixing duct 98, in which the high temperature air and external air may not be effectively mixed in the mixing duct 98. In the configuration of FIG. 23, the plurality of plate members 98c is disposed in the mixing duct 98. Therefore, the hot-air exhaust rising in the mixing duct 98 hits the plate member 98c disposed at the lower side, by which the air current of the light-source exhaust can be disturbed. With this configuration, the low-temperature air flowing from the inflow port 98a can be effectively mixed with the hot-air exhaust (i.e., high-temperature air), by which the temperature of the hot-air exhaust can be decreased effectively.

Further, the hot-air exhaust (i.e., high-temperature air) that hits the plate member 98c disposed at the lower position further rises by the updraft force of the hot-air exhaust, and moves toward the exhaust fan 86, and then hits another plate member 98c disposed at further upper position. As described above, the rising hot-air exhaust may hit the plate members 98c one by one as the hot-air exhaust rises. With this configuration, the air current of the hot-air exhaust (i.e., high-temperature air) can be effectively disturbed, and the hot-air exhaust (i.e., high-temperature air) can be further mixed with the low-temperature air. As described above, because the plate members 98c disposed at the higher positions are closer to the exhaust fan 86 compared to the plate members 98c disposed at the lower positions, the mixing of the hot-air exhaust and the low-temperature air can be further accelerated in the mixing duct 98, by which temperature of the hot-air exhaust can be effectively decreased in the mixing duct 98.

Further, because the air current exhausted from the mixing duct 98 is disturbed by the plate members 98c, such exhausted air can be effectively mixed with another low-temperature air flowing around a space outside the mixing duct 98, which is used as a third flow path, at a space between the exit side of the mixing duct 98 and the exhaust fan 86, the temperature of the hot-air exhaust (i.e., high-temperature air) can be further decreased. With this configuration, the temperature of the exhaust air exhausted from the exhaust port 85 can be further decreased.

Variant Example Embodiment

Figure 24:
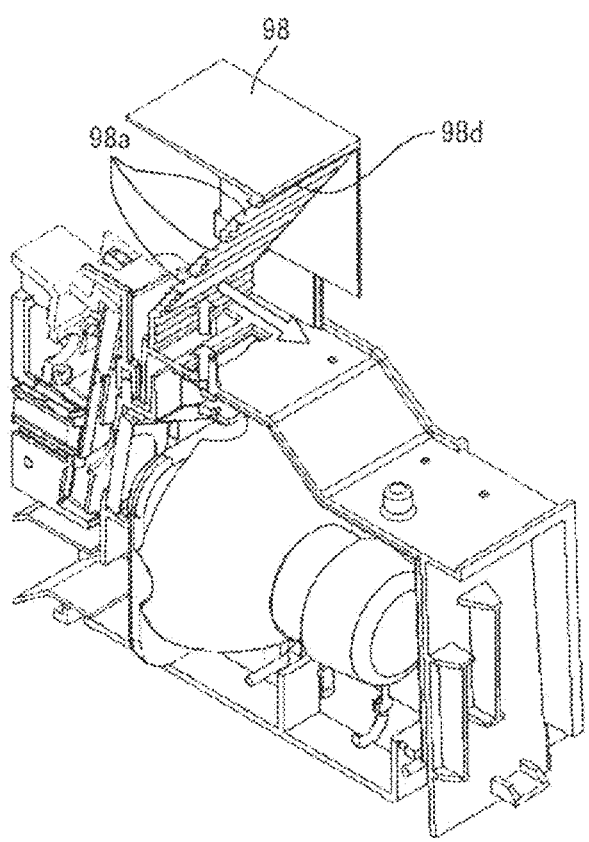
FIG. 24 shows a schematic perspective view of a mixing duct according to a variant example embodiment.
Figure 25:
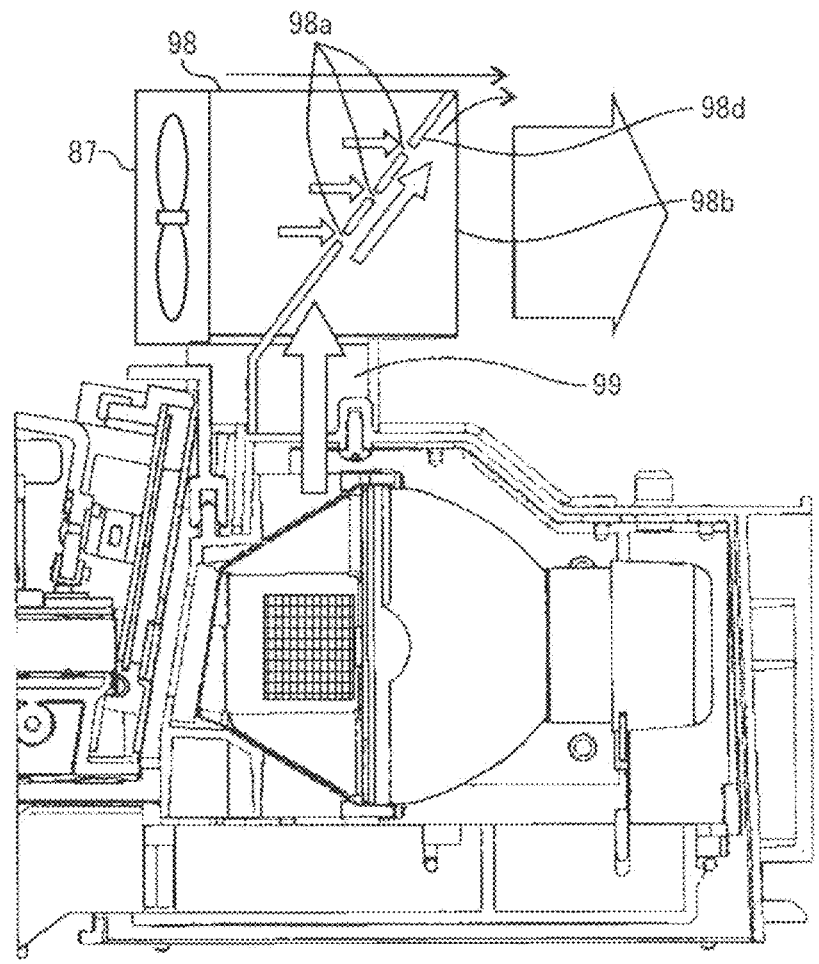
FIG. 25 shows a cross-sectional view of the mixing duct of FIG. 24.
Figure 26:
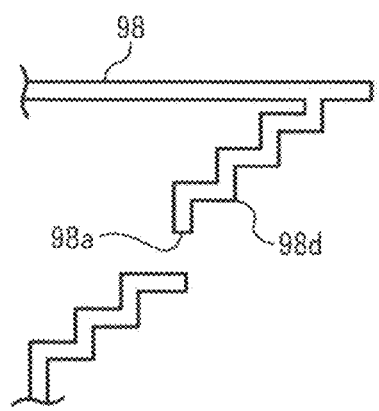
FIG. 26 shows an inclining member having a step-like shape.

A description is given of a variant example embodiment with reference to FIGS. 24 to 26. FIG. 24 shows a schematic perspective view of a mixing duct according to a variant example embodiment, and FIG. 25 shows a cross-sectional view of the mixing duct of FIG. 24. As shown in FIGS. 24 and 25, as the variant example embodiment, the mixing duct 98 includes an inclining member 98*d*, and the inclining member 98*d* is provided with the inflow port 98*a* used as the second flow path.

In this variant example embodiment, the hot-air exhaust rises in the light-source exhaust duct 99*a* used as the first flow path (FIG. 25), and flows into the mixing duct 98 while being guided by the inclining member 98*d* in the direction toward the exhaust fan 86. The hot-air exhaust (i.e., high-temperature air) moving along the inclining member 98*d* can be mixed with the low-temperature air flowing from the inflow port 98*a*. Further, by forming the plurality of the inflow ports 98*a* on the inclining member 98*d*, the air current in the mixing duct 98 can be disturbed effectively, by which the mixing of the hot-air exhaust and the low-temperature air in the mixing duct 98 can be further accelerated, by which the temperature of the hot-air exhaust can be decreased effectively in the mixing duct 98.

Further, because the air flow exhausted from the mixing duct 98 is already disturbed by the air from the plurality of inflow ports 98*a*, the exhaust air can be effectively mixed with the low-temperature air, flowing around a space outside the mixing duct 98, at a space between the mixing duct 98 and the exhaust fan 86, by which the temperature of the hot-air exhaust can be further decreased. With this configuration, the temperature of exhaust air exhausted from the exhaust port 85 can be further decreased.

Further, in the variant example embodiment, the cross-sectional shape of the mixing duct 98 can be set greater as closer toward the exhaust fan 86. With this configuration, the hot-air exhaust flowing into the mixing duct 98 can be effectively diffused and mixed with the low-temperature air, flowing around a space outside the mixing duct 98, at a space between the mixing duct 98 and the exhaust fan 86, by which the temperature of the hot-air exhaust (i.e., high-temperature air) can be further decreased effectively.

Further, as shown in FIG. 26, the inclining member 98*d* having a step-like shape may be used. The inclining member 98*d* of step-like shape has a concave/convex shape. By forming the concave and convex portions for the inclining member 98*d*, the air current of the hot-air exhaust (i.e., high-temperature air) guided by the inclining member 98*d* can be disturbed, by which the hot-air exhaust (i.e., high-temperature air) can be effectively mixed with the low-temperature air flowing from the inflow port 98*a*.

Further, if the inclining member 98*d* is a flat member, the flare light coming from the light source 61 may reflect regularly at the inclining member 98*d*, and then exits from the exhaust port 85. In contrast, by forming the concave/convex shape for the inclining member 98*d*, the light coming from the light source 61 can be diffused and reflected at the inclining member 98*d*, by which the flare light may not exit from the exhaust port 85. Further, although the inclining member 98*d* is formed as step-like shape in FIG. 26, the inclining member 98*d* can be shaped in any shapes as long as the concave/convex shape is formed.

The above-described example embodiment may have following effects. The above-described image projection apparatus includes the light source 61, and uses light emitted from the light source 61 to project images. The above-described image projection apparatus includes the air-intake port 84, the exhaust port 85, the first ventilation unit, the first flow path, and the second flow path. The air-intake port 84 is used to take in air into the body of the projector 1. The exhaust port 85 is used to exhaust air from the body of the projector 1. The first ventilation unit or first air supply unit is, for example, the exhaust fan 86 to cause an airflow that flows from the air-intake port 84 to the exhaust port 85. The first flow path includes, for example, the light-source exhaust duct 99, to which the hot-air exhaust that has increased its temperature with the effect of the light source 61 flows in. The second flow path includes, for example, the inflow port 98*a*, into which a part of the low-temperature air, taken from the air-intake port 84 and having a temperature lower than the hot-air exhaust flows. The above-described image projection apparatus further includes the mixing unit such as the mixing duct 98 that is used to mix the hot-air exhaust flowing from the first flow path and the low-temperature air flowing from the second flow path. Further, the mixed air exhausted from the mixing flow path converges with the air taken from the air-intake port 84, but not flowing into the second flow path, at a space between the mixing unit and the exhaust port 85. The above-described image projection apparatus further includes the intermediary fan 87 used as the second ventilation unit or a second air supply unit that can forcibly cause an air flow going to the mixing duct 98 along the second flow path. With this configuration, the mixed air exhausted from the mixing unit can be further mixed with the air taken from the air-intake port 84 before the mixed air is exhausted from the exhaust port 85, and the air can be exhausted from the exhaust port 85 while effectively cooling the exhaust air at a good enough level, which means ineffective cooling of the hot-exhaust air in the mixing unit due to the insufficient supply of the low-temperature air to the mixing unit can be prevented.

Further, in the above-described image projection apparatus, at least one second ventilation unit such as the intermediary fan 87 is disposed at the upstream side of air flow direction with respect to the second flow path. With this configuration, the low-temperature air can be supplied to the mixing unit effectively and efficiently.

Further, in the above-described image projection apparatus, the inflow direction of the hot-air exhaust (i.e., high-temperature air) taking in from the first flow path and the inflow direction of the low-temperature air taking in from the second flow path are set perpendicular with each other. With this configuration, the air current of hot-air exhaust can be effectively disturbed, and the hot-air exhaust and the low-temperature air can be mixed effectively in the mixing unit.

Further, in the above-described image projection apparatus, the mixing unit such as the mixing duct 98 has a wall face, and the hot-air exhaust (i.e., high-temperature air) flowing from the first flow path hits the wall face of the mixing unit. Further, the low-temperature air flowing from the second flow path flows to a space defined by the wall face and the first flow path. With this configuration, when the hot-air exhaust hits the wall face, the air current of the hot-air exhaust is disturbed, and then the low-temperature air flows into such air current disturbed hot-air exhaust. With this configuration, the hot-air exhaust and the low-temperature air can be mixed effectively at the mixing unit. Then, the mixed air can be exhausted from the mixing unit under the air-current disturbed condition, and further, the mixed air can be effectively mixed with the low-temperature air at a space between the mixing unit and the exhaust port.

Further, in the above-described image projection apparatus, the plurality of plate members 98c are disposed in the mixing unit, in which each of the plate members 98c extends in a direction parallel to a flow direction of the low-temperature air taking in from the second flow path, and the plurality of plate members 98c are disposed in the mixing unit while setting a given interval between the plate members 98c in a direction perpendicular to a flow direction of the low-temperature air taking in from the second flow path. With this configuration, the hot-air exhaust can hit the plate members 98c many times, by which the air current of the hot-air exhaust in the mixing unit such as the mixing duct 98 can be effectively disturbed, and thereby the mixing of the hot-air exhaust and the low-temperature air in the mixing unit can be accelerated. With this configuration, the temperature of the hot-air exhaust can be decreased effectively, and it can prevent that the temperature of exhaust air exhausted from an exhaust unit such as the exhaust port 85 becomes too high temperature. Further, because the mixed air can be exhausted from the mixing unit under the air-current disturbed condition, the mixed air can be effectively mixed with the low-temperature air at a space between the mixing unit and the exhaust port.

Further, in the above-described image projection apparatus, each of the plate members 98c are disposed in the mixing unit while shifting the position of each of the plate members 98c in a flow direction of the low-temperature air taking in from the second flow path. Specifically, the plate members 98c disposed near to the first flow path are set far from an exhaust unit, and the plate members 98c disposed farther from the first flow path are set near to the exhaust unit. With this configuration, the hot-air exhaust having high temperature can hit the plate members 98c many times in the mixing unit such as the mixing duct 98 when the hot-air exhaust flows toward the exhaust unit such as the exhaust port 85. With this configuration, the air current of hot-air exhaust can be disturbed effectively, and the mixing of the hot-air exhaust and the low-temperature air in the mixing unit can be further accelerated.

Further, in the above-described image projection apparatus, an inclining member such as the inclining member 98d can be disposed in the mixing unit. The inclining member, angled with respect to the exhaust unit, can be formed with the second flow path. With this configuration, as described in the variant example embodiment, the air current of the hot-air exhaust (i.e., high-temperature air) moving along the inclining member can be disturbed by the low-temperature air taking in from the inflow port 98a, and the hot-air exhaust and the low-temperature air can be mixed in the flow path. With this configuration, the temperature of the hot-air exhaust can be decreased in the mixing unit, and thereby the temperature of the exhaust air exhausted from the exhaust port 85 can be decreased.

Further, because the mixed air can be exhausted from the mixing unit under the air-current disturbed condition, the mixed air can be effectively mixed with the low-temperature air at a space between the mixing unit and the exhaust port. Further, the cross-shape of the mixing unit such as the mixing duct 98 can be set greater as closer toward the exhaust port 85. With this configuration, the air flowing in the mixing unit can be effectively diffused and then exhausted from the mixing unit. With this configuration, the mixed air can be effectively mixed with the low-temperature air at a space between the mixing unit and the exhaust port, thereby the temperature of air exhausted from the exhaust port can be lowered effectively.

Further, in the above-described image projection apparatus, the inclining member 98d may be formed into a step-like shape to form concave and convex portions for the inclining member 98d. With this configuration, the air current of the hot-air exhaust (i.e., high-temperature air) guided by the inclining member 98d can be disturbed effectively, by which the mixing of the hot-air exhaust and the low-temperature air in the mixing unit can be accelerated, and thereby the temperature of hot-air exhaust can be decreased effectively. Further, because the mixed air can be exhausted from the mixing unit under the air-current disturbed condition, the mixed air can be effectively mixed with the low-temperature air at a space between the mixing unit and the exhaust port.

Further, in the above-described image projection apparatus, the mixing unit is disposed at a position between the light source unit and the power source unit that supplies power to the light source unit. With this configuration, the hot-air exhaust having high temperature (i.e., high-temperature air) is mixed with the low-temperature air in the mixing unit, by which the temperature of the hot-air exhaust can be decreased, and thereby the high temperature condition of the power source unit, which may be caused by the heat of hot-air exhaust, can be prevented. Therefore, the power source unit can supply power to the light source or the like stably.

Further, in the above-described image projection apparatus, the mixing unit is disposed at a position between the operation unit 83 that a user uses for operating the apparatus, and the light source unit 60. With this configuration, the hot-air exhaust having high temperature (i.e., high-temperature air) is mixed with the low-temperature air in the mixing unit, by which the temperature of the hot-air exhaust can be decreased, and thereby the high temperature condition of the operation unit 83, which may be caused by the heat of hot-air exhaust, can be prevented. With this configuration, the temperature increase of the operation unit 83, which may be caused by the air having high temperature by cooling the light source 61 can be prevented. Therefore, even if the operation unit 83 is disposed on the top face of the apparatus, a user can operate the operation unit 83 without feeling too much heat that causes the user difficult to operate the operation unit 83.

In the above described example embodiments, the mixed air exhausted from the mixing unit can be mixed with air taken from the intake port to cool the mixed air, in which the cooling of the hot-air exhaust in the mixing unit can be effectively conducted.

Further, in the above described example embodiments, the mixed air cooled and exhausted from the mixing unit can be mixed with air taken from the intake port, not flowing into the second flow path, at a space between mixing unit and the exhaust port. Therefore, the exhaust air can be exhausted from the exhaust port after effectively cooing the exhaust air. Further, even if the internal pressure of the mixing unit such as the mixing duct 98 becomes high, the low-temperature air can be flowed into the mixing duct 98 from the inflow port 98a using the intermediary fan 87 used as the second air supply unit forcibly. With this configuration, insufficient flow of the low-temperature air to the mixing duct 98 from the inflow port 98a can be prevented, and insufficient cooling of the hot-air exhaust by the low-temperature air in the mixing duct 98 can be prevented.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image projection apparatus, comprising:
a light source to emit light;
an optical unit including a curved mirror and a plurality of lenses to project an image generated by an image generator onto a screen by using the light emitted from the light source;
an intake port to take low-temperature air into the image projection apparatus;
an exhaust port to exhaust air from the image projection apparatus;
a first ventilation unit to generate air flow from the intake port to the exhaust port;
a first flow path for hot-air exhaust having increased its temperature by taking heat from the light source while flowing around the light source;
a second flow path for a part of the low-temperature air, taken from the intake port, having a temperature lower than the hot-air exhaust; and
a mixing unit to mix the hot-air exhaust from the first flow path and the low-temperature air from the second flow path, wherein the air mixed and exhausted from the mixing unit converges at a space between the mixing unit and the exhaust port with another part of the low-temperature air taken from the intake port, flowing from a third flow path outside the mixing unit; and
a second ventilation unit to generate air flow into the second flow path, wherein the second ventilation unit intakes air having passed through a space between the curved mirror and a portion of an outer cover of the image projection apparatus, the portion of the outer cover facing a rear face of the curved mirror.

2. The image projection apparatus of claim 1, wherein the second ventilation unit is disposed at an upstream side of a direction of the air flow of the second flow path.

3. The image projection apparatus of claim 1, wherein an inflow direction of the hot-air exhaust flowing in the first flow path and an inflow direction of the low-temperature air flowing in the second flow path are perpendicular to each other.

4. The image projection apparatus of claim 1, wherein the mixing unit has a wall face that the hot-air exhaust flowing from the first flow path hits, and the low-temperature air flows from the second flow path into a space defined by the wall face and the first flow path.

5. The image projection apparatus of claim 1, wherein the mixing unit comprises a plurality of plate members each set parallel to an inflowing direction of the low-temperature air from the second flow path,
wherein the plate members are disposed in the mixing unit at predetermined intervals in a direction perpendicular to the inflowing direction of the low-temperature air from the second flow path.

6. The image projection apparatus of claim 5, wherein a position of each of the plate members is shifted in the inflowing direction of the low-temperature air from the second flow path, with a plate member disposed farthest from the first flow path positioned closer to the exhaust port than the plate member disposed closest to the first flow path.

7. The image projection apparatus of claim 1, wherein the mixing unit is provided with an inclining member angled with respect to the exhaust port, and the second flow path is formed on the inclining member.

8. The image projection apparatus of claim 7, wherein the inclining member has alternating concave and convex portions.

9. The image projection apparatus of claim 1, further comprising a power source to supply power to the light source,
wherein the mixing unit is disposed between the light source and the power source unit.

10. The image projection apparatus of claim 1, further comprising an operation unit for operating the image projection apparatus,
wherein the mixing unit is disposed between the light source and the operation unit.

* * * * *